US005311589A

United States Patent [19]
Bennett et al.

[11] Patent Number: 5,311,589
[45] Date of Patent: May 10, 1994

[54] APPARATUS AND METHOD FOR AUDIBLE SIGNALING TONE RECOGNITION

[75] Inventors: Raymond W. Bennett, Naperville; Joseph G. Klinger, Sandwich; Brian C. Prorok, Naperville; Rafid A. Sukkar, Aurora, all of Ill.

[73] Assignee: AT&T Bell Laboratories, Murray Hill, N.J.

[21] Appl. No.: 860,937

[22] Filed: Mar. 31, 1992

[51] Int. Cl.$^5$ ............................................. H04M 3/00
[52] U.S. Cl. ..................................................... 379/386
[58] Field of Search ....................... 379/386, 282, 283; 340/825.48, 825.71

[56] References Cited

U.S. PATENT DOCUMENTS

| 4,405,833 | 9/1983 | Cave et al. | 179/1 MN |
| 4,747,131 | 5/1988 | Beirne | 379/386 X |
| 4,849,688 | 7/1989 | Chuba et al. | 324/78 |
| 4,932,062 | 6/1990 | Hamilton | 381/43 |

OTHER PUBLICATIONS

"Conceptual Models of Telephony and Their Implications for User Interface Design and Telecommunications Services", R. W. Bennett, Feb. 23, 1990.
"Algorithms for Multi-Channel DTMF Detection for the WE® DSP32 Family", S. L. Gay, et al., *International Conference on Acoustics, Speech and Signal Processing*, 1989, pp. 1134–1137.
*Digital Signal Processing*, A. V. Oppenheim, et al., pp. 287≧289.
Linear Prediction Based DTMF Detection for the WEDSP32 Digital Signal Processor Family, 1989 (Submitted in serial #07/857552).

*Primary Examiner*—James L. Dwyer
*Assistant Examiner*—Creighton Smith
*Attorney, Agent, or Firm*—Michael B. Johannesen

[57] ABSTRACT

A method and apparatus for detecting dual-tone, multi-frequency (DTMF) digits and call progress tones by determining the amplitudes of preselected frequencies in a signal over a predetermined time period, and determining a candidate tone by selecting two of the preselected frequencies with the highest amplitudes and comparing the two selected frequencies to known DTMF and call progress tone frequencies. The amplitudes of the two selected frequencies are then tested against predefined thresholds corresponding to a candidate tone having the two selected frequencies. The candidate tone in the current time period is tested against candidate tones in previous time periods for consistency. If the candidate tone is a DTMF digit and passed all of the tests, then the DTMF digit is returned. If the candidate tone is a call progress tone, the pattern of the candidate tone over a plurality of predetermined time periods is recorded and tested against known patterns of the candidate tone. If the candidate tone meets all of the above tests, the call progress tone is returned.

16 Claims, 20 Drawing Sheets

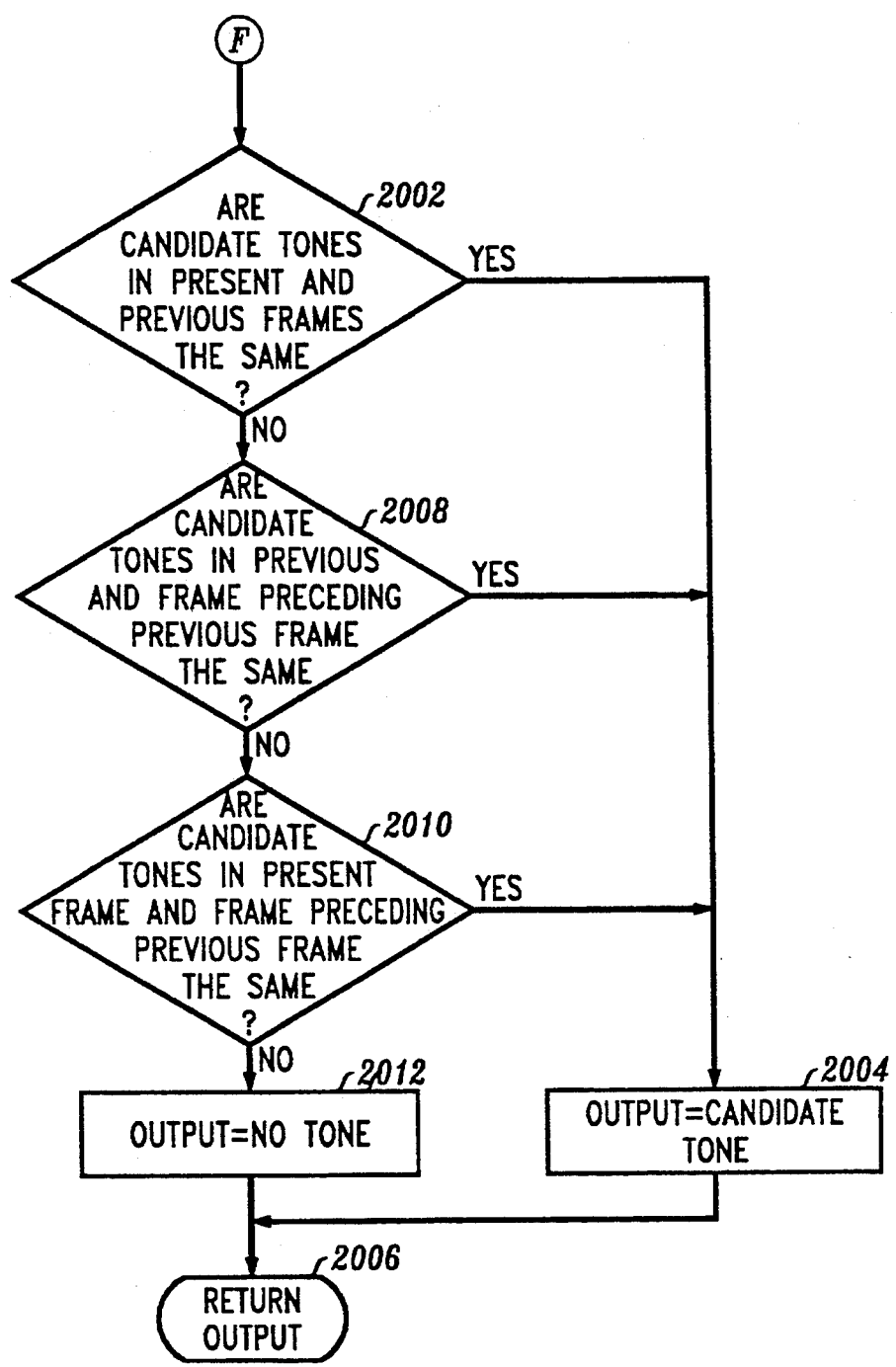

APPARATUS AND METHOD FOR AUDIBLE SIGNALING TONE RECOGNITION

TECHNICAL FIELD

This invention relates to the field of telephone call processing, and, more specifically, to the area of audible signaling tone recognition, and most specifically, to dual-tone, multifrequency (DTMF) digit and call progress tone detection.

BACKGROUND OF THE INVENTION

Telephony is increasingly "feature rich," i.e., there is an ever increasing array of features and services available to both business and individual customers. Features are being implemented in "smart" telephones, in local switching systems, and in long distance network switching systems to provide customers with conveniences and facilities that were unavailable until recent times. Three-way calling, call waiting, speed calling, credit card calling, etc., are now familiar examples of switch-implemented features. "Smart" telephones, facsimile machines and the like can automatically redial busy or no-answer numbers. All such features and services require that the device providing the feature recognize audible signaling tones, such as dual-tone, multi-frequency (DTMF) digits and call progress tones, which are generated by the network or local switching system.

Detection of audible signaling tones reliably is a well known problem in the art. For example, Cave et al., U.S. Pat. No. 4,405,833 which issued to TBS International, Inc., on Sep. 20, 1983, describes a telephone call progress tone and answer identification circuit. In Cave, call progress tones are identified by measuring the periods of the envelope cycles in the frequency range of DTMF and call progress tones. The periods are classified by their lengths, and compared to known periods as used by the various operating companies. This method requires many periods in order to determine a tone, and is subject to false positives, or "talk off" due to noise or verbal patterns of individuals which may resemble a call progress tone when analyzed in this fashion. Talk off can occur when speech, music or other sounds exist in the signal wherein the frequency and amplitude of the fundamentals or harmonics resemble that of audible signaling tones. Most signal processors have similar complexity and talk off problems.

The problems of detecting audible signaling tones arise from the nature of the telephone network. The frequencies for DTMF digits and call progress tones were selected so that they were near the lower end, but well within the telephone band pass of 180–3600 Hz. DTMF digits are defined by the following matrix:

TABLE 1

|        | 1209 Hz | 1336 Hz | 1477 Hz | 1633 Hz |
|--------|---------|---------|---------|---------|
| 697 Hz | 1       | 2       | 3       | A       |
| 770 Hz | 4       | 5       | 6       | B       |
| 852 Hz | 7       | 8       | 9       | C       |
| 941 Hz | *       | 0       | #       | D       |

Call progress tones are defined by the following frequency matrix:

TABLE 2

|        | 0 Hz | 440 Hz | 480 Hz | 620 Hz |
|--------|------|--------|--------|--------|
| 350 Hz |      | Dial Tone/ Stutter Dial Tone | | |
| 440 Hz | Call Waiting/ Variations | | Ringing | |
| 480 Hz |      |        |        | Busy/ Reorder |

These two matrixes are well known in the art, wherein each digit or call progress tone is defined by the intersection of the horizontal and vertical frequency. When the two frequencies are simultaneously received, it is universally interpreted to the alphanumeric character or the call progress tone as shown at the matrix intersections. Hence indicators used in the telephone system, such as DTMF digits and call progress tones, each correspond uniquely to a DTMF tone defined by two specified frequency components. Each tone in the above tables has a predefined functional meaning accepted in the art.

A call waiting tone is a special case of a DTMF tone. Call waiting is defined similarly to the other DTMF and call progress tones, but has one frequency defined as 0 Hz. In actuality, there is no component at 0 Hz, as there is no D.C. component at 0 Hz for call waiting tones. As a consequence of having one frequency which is shared with Ringing, call waiting tones are harder to detect reliability without false positives.

Additionally, most call progress tones have at least two different rhythmic patterns or cadences with unique meanings. "Busy," for example, may be fast busy (reorder) or slow busy (busy line). Dial tone may be stutter dial tone (short tones and a long tone), as used in features such as three-way calling, or as a constant tone for regular dial tone. Call waiting can have several different patterns, used, for example, when multiple telephone numbers are associated with one telephone to distinguish the line that has the call waiting.

Dual-frequencies were selected for the majority of these tones so that they are not harmonically related, and so that there is little similarity to the harmonically complex relationships of the human voice. However, human speech includes many fundamental and harmonic frequencies in the 350–1633 Hz range of DTMF digits and call progress tones, which cause talk off. Noise on the line compounds the false positive problem because noise occurs in all frequency bands.

Additionally, when two frequencies of a DTMF digit or call progress tone are transmitted, their relative amplitudes ideally should be identical. Due to the nature of the telephone network, however, the relative amplitudes are rarely the same. Therefore, the relative amplitudes of the two frequencies of a specific digit or tone must be within a predefined ratio or "twist." Since amplitude typically decreases as the frequency increases on a telephone line, the "twist" for DTMF and call progress tones is generally accepted at 8 dB. Occasionally the reverse occurs, and the higher frequency has a greater amplitude than the lower frequency. This is called "reverse twist" and the generally accepted "reverse twist" ratio is 4 dB. If the twist or reverse twist is greater than these tolerances, the tone should not be recognized as a DTMF digit or call progress tone. Finally, each DTMF digit must be present for at least 40 ms. to be recognized.

Therefore, a problem in the art is that there is no method and apparatus for reliably detecting audible signaling tones in both the presence and absence of speech. A further problem in the art is that there is no method and apparatus for reliably detecting call waiting tones in both the presence and absence of speech.

SUMMARY OF THE INVENTION

These problems are solved and a technical advance is achieved in the art by an apparatus and method for reliably detecting audible signaling tones, including call waiting tones, in both the presence and absence of speech. The method detects audible signaling tones by determining the amplitudes of preselected frequencies in a signal over a predetermined time period, and determining a candidate tone by selecting two of the preselected frequencies with the highest amplitudes and comparing the two selected frequencies to known DTMF and call progress tone frequency components. The amplitudes of the two selected frequencies are then tested against predefined thresholds corresponding to a candidate tone having the two selected frequencies. The candidate tone in the current time period is tested against candidate tones in previous time periods for consistency. If the candidate tone is a DTMF digit and passed all of the tests, then the DTMF digit is returned. If the candidate tone is a call progress tone, the pattern of the candidate tone over a plurality of predetermined time periods is recorded and tested against known patterns Advantageously, the signal is digitally sampled and assembled into a frame, and the determining of amplitudes at predetermined frequencies is performed by Geortzel analysis. A candidate tone is thus determined for each frame, and the candidate tone for each frame may be compared for consistency.

A signal processing apparatus for detecting and reporting audible signaling tones in a signal according to this invention comprises means for determining two frequencies in the signal with the highest amplitudes in a predetermined time period, means for comparing the two determined frequencies with predefined frequency components of DTMF digits and call progress tones to determine a candidate tone, and means for comparing the amplitude of the two determined frequencies to amplitude thresholds based on the candidate tone corresponding to the two determined frequencies. The signal processing apparatus further comprises means for determining a continuity period for to determine whether the candidate tone is present over a predefined time period, and means responsive to the candidate tone being determined to be a DTMF digit and passing the tests for generating an output signal representing the candidate tone. The signal processing apparatus also comprises means responsive to the candidate tone being determined to be a call progress tone for determining whether a pattern of the candidate tone over time matches a predefined pattern based on the candidate tone corresponding to the two selected frequencies, and means responsive to the candidate tone being determined to be a call progress tone and passing the tests for generating an output signal representing the candidate tone.

BRIEF DESCRIPTION OF THE DRAWING

FIGS. 4–20 are charts illustrating the flow of control of a audible signaling tone recognition device according to the preferred embodiment of this invention.

DETAILED DESCRIPTION

Figure 1:
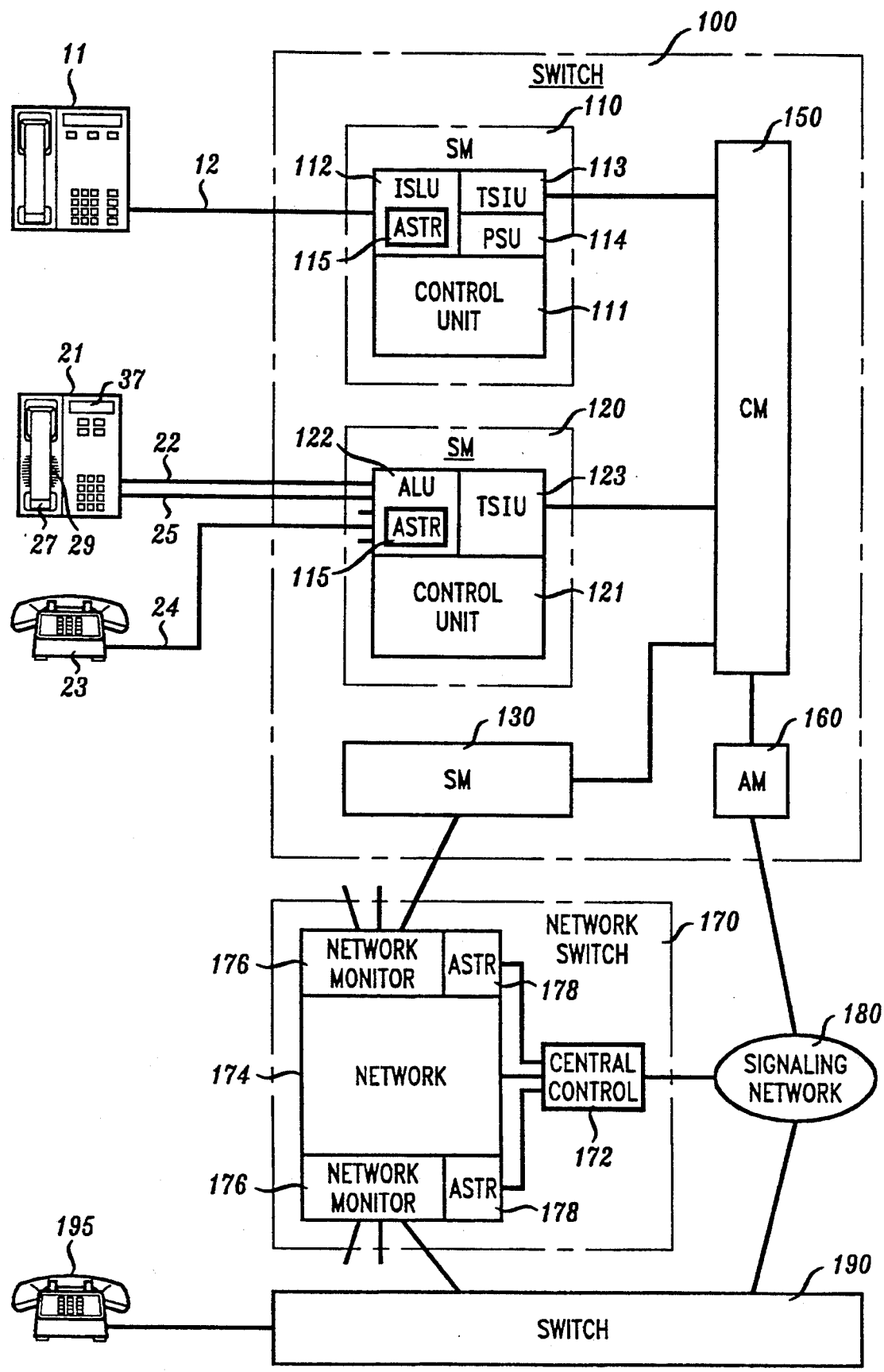
FIG. 1 is a block diagram of a switching network configuration including exemplary embodiments of this invention.

An exemplary apparatus and method for audible signaling tone recognition is described herein in the context of a telephone switching network configuration of FIG. 1, having two central office switches, 100 and 190, an interswitch signaling network 250, e.g., a common channel signaling (CCS7) network and illustrative communications stations, including conventional analog telephone station sets 21, 23, and 195, an integrated services digital network (ISDN) telephone station set 11. Switches 100 and 190 are interconnected by a communication path 26, which may include intermediate switches. Illustratively, switch 100 is a distributed control, ISDN electronic telephone switching system such as the system disclosed in U.S. Pat. No. 4,592,048, issued to M. W. Beckner, et al., on May 27, 1986.

An integrated services digital network (ISDN) is a network that provides end-to-end connectivity to support a wide range of services, including voice and non-voice services, to which users have access by a limited set of standard, multipurpose customer interfaces. Switch 100 includes a number of switching modules (SMs), each associated with a different set of telephone station sets or trunks. Each switching module includes a control unit for controlling connections to and from its associated telephone station set or trunks. Switching module 110, for example, includes control unit 111 for controlling connections to and form telephone station set 11. Switching module 120 includes control unit 121 for controlling connections to and from telephone station set 23.

The architecture of switch 100 includes communication module (CM) 150 as a hub with switching modules 110, 120, and 130, and an administrative module (AM) 160 emanating therefrom. Switching module 110 includes an integrated services line unit (ISLU) 112, which terminates the digital subscriber lines, e.g., 12, and provides access to a time slot interchange unit (TSIU) 113 and a packet switching unit (PSU) 114. TSIU 113 and 114, respectively, provide circuit and packet switched connections to and from the associated telephone station set 11 over digital subscriber line 12 under control of control unit 111.

Switching module 120 includes an analog line unit (ALU) 122 which terminates conventional analog lines (i.e., tip-ring pairs), 22, 24, and provides access to TSIU 123. TSIU 123 provides circuit-switched connections to and from the associated telephone station sets 21, 23 under control of control unit 121. Switching module 130 is similar to switching modules 110 and 120, but includes the appropriate analog or digital trunk unit (not shown) for interfacing with the outgoing trunks included in communication path 26 to network switch 170.

Communications module 150 includes a time-shared space-division switch or time-multiplexed switch (TMS) as a switch fabric for communication among switch modules and the administrative module (AM)

160. Administration module (AM) 160 provides coordination of the functional components of switch 100 and human-machine interface. AM 160 also provides a connection to signaling network 180.

Network switch 170 is connected to switch 100 by one or more trunk groups, as is known in the art, and is connected to many other switches and network switches (not shown). Network switch 170 comprises a central control 172 and a switching network 174. Network monitors 176, as will be described below, is located on either side of network 174 to monitor incoming and outgoing calls for inband signaling. Network monitors 176 include audible signaling tone recognition devices 178 according to the exemplary embodiment of this invention to detect DTMF digits and call progress tones and report them to central control 172.

To complete the description of FIG. 1, switch 190 is shown connected to a conventional analog telephone station set 195, for purposes of illustration. The architecture of switch 190 and the types of telephone station sets served by switch 190 are not important to the present invention and are thus not described further.

An apparatus and method audible signaling tone recognition may be achieved in a first embodiment in connection with SMs 110 and 120. Audible signaling tone recognition in SM 110 is generally performed in ISLU 112, as known in the art. In SMs such as 120, audible signaling tone recognition is generally performed in ALU 122. The only difference between providing call progress tone detection is ISLU 112 and ALU 122 is that an analog-to-digital (A/D) converter is required for a call progress tone detector ALU 122, as will be described below, in connection with FIG. 2. Alternatively, audible signaling tone recognition may be performed in any part of switch 100 that has access to the telephone signal to be tested for audible signaling tones.

To illustrate the operation of an audible signaling tone recognition device of the first exemplary embodiment, the user of telephone 23 removes the handset from the switch hook. In response to this action, control unit 121 causes ALU 122 to send dial tone to telephone 23 and causes audible signaling tone recognition device 115 to monitor channel 24 for signaling. The user of telephone 23 dials a telephone number, for example, the directory number of telephone 195, by entering DTMF digits at the keypad. As the digits are entered, audible signaling tone recognition device 115 receives the incoming signal from channel 24, determines which digits were entered by determining the amplitudes of preselected frequencies in a signal over a predetermined time period. Next, audible signaling tone recognition device 115 determines a candidate tone by selecting two of the preselected frequencies with the highest amplitudes and comparing the two selected frequencies to known DTMF and call progress tone frequency components. The amplitudes of the two selected frequencies are then tested against predefined thresholds corresponding to a candidate tone having the two selected frequencies. The candidate tone in the current time period is tested against candidate tones in previous time periods for consistency. If the candidate tone is a DTMF digit and passed all of the tests, then the DTMF digit is returned. Audible signaling tone recognition device 115 then translates the digit into machine usable form, and reports the entered digit to control unit 121. Control unit 121 collects the digits and uses them to complete the call to destination telephone 195, as is known in the art.

For purposes of this description of this first exemplary embodiment, the user of telephone 23 has available a group of "enhanced services," as known in the art. Enhanced services, such as conference calling, call waiting, speed calling, etc., are invoked by entering one or more DTMF digit. When a user subscribes to enhanced services, audible signaling tone recognition device 115 is attached to the line whenever the user of telephone 23 flashes the switch hook.

The user of telephone 23 may signal to SM 120 to initiate a different feature, such as sending DTMF digit "1", for example, to initiate conference calling at the same time the call waiting tone is received. Since call waiting tones from the network and DTMF tones from telephone 23 may occur at the same time, audible signaling tone recognition device 115 detects DTMF digits and call progress tones simultaneously. Thus, SM 110 may provide the conferencing feature to telephone 23 and route the additional call to telephone 21 simultaneously.

An audible signaling tone recognition device may be incorporated, in a second embodiment, in a network switch 170, comprising central control 172, a switching network 174, and network monitor facilities 176 on either side of switching network 174. Network monitor facilities 176 are described in U.S. patent application Ser. No. 07/808,348, assigned to the assignee of this invention, and incorporated herein by reference. Several new features and services for long-distance customers have been proposed, as described in the above-cited patent application. These features assume that the signal processors may detect both DTMF digits and call progress tones simultaneously for the entire duration of a network call, and will take action in response to receipt of such digits or tones.

A digital signal is received from network monitor 176 at audible signaling tone recognition device 178 for analysis. Audible signaling tone recognition device 178 compares the amplitudes of preselected frequencies in the signal over a predetermined time period, and determining a candidate tone by selecting two of the preselected frequencies with the highest amplitudes and comparing the two selected frequencies to known DTMF and call progress tone frequency components. The amplitudes of the two selected frequencies are then tested against predefined thresholds corresponding to a candidate tone having the two selected frequencies. The candidate tone in the current time period is tested against candidate tones in previous time periods for consistency. If the candidate tone is a DTMF digit and passed all of the tests, then the DTMF digit is returned. If the candidate tone is a call progress tone, the pattern of the candidate tone over a plurality of predetermined time periods is recorded and tested against known patterns of the candidate tone. If the candidate tone meets all of the above tests, the call progress tone is returned. Audible signaling tone recognition device 178 send the returned DTMF digit or call progress tone to central control 172.

A third embodiment of an audible signaling tone recognition device may be incorporated into telephone 21. Telephone 21 is, in this exemplary embodiment, a "smart phone" that provides many features and services that may not be available from the local switch. Telephone 21 comprises a handset 27, four signaling buttons, 31–34, and a screen or display 37. In this embodiment, telephone 21 is connected via channel 22 through switch 100 to telephone 11 on a first portion of a conference call, and via channel 25 through switch 100 to telephone 24 on a second portion of a conference call. The user of telephone 195 then dials the telephone number associated with channel 22 of telephone 21. The audible signaling tone recognition device in telephone 21 receives the call waiting tone, and causes telephone 21 to display an indication that channel 22 has a call waiting. Without the call progress tone recognition device of this invention, which channel broadcast the call waiting tone cannot be determined. The application of this invention in the third exemplary embodiment will be described in more detail in connection with FIG. 3, below.

Figure 2:
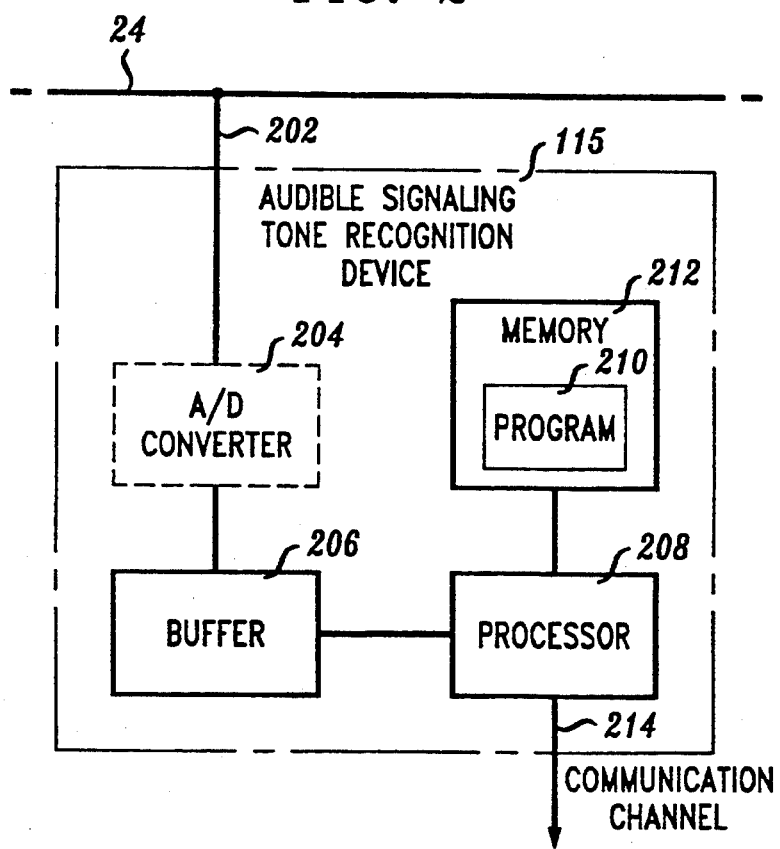
FIG. 2 is a block diagram of a signal processor incorporating an exemplary method according to this invention, as implemented in the switching network of FIG. 1.

Turning now to FIG. 2, an audible signaling tone recognition device is shown, illustrating audible signaling tone recognition device 115, FIG. 1. Audible signaling tone recognition device 115 is illustrated as connected to channel 24. In this embodiment of this invention, audible signaling tone recognition device 115 receives signals from channel 24 via bus 202. In embodiments where the channel transmits analog signals, bus 202 delivers analog signals to the input of an analog-to-digital (A/D) converter 204 (shown in phantom in FIG. 2). A/D converter 204 receives the analog signal, samples the signal and translates it into a 16 bit linear, 8 KHz samples, in the preferred embodiment. The samples are delivered to a buffer 206. In embodiments of this invention where the channel is digital, such as channel 12, the A/D converter 204 is not necessary, as the analog signal has previously been sampled, and the digital signal is delivered directly to buffer 206.

Audible signaling tone recognition device 115 collects digital samples in buffer 206 and holds, for example, 320 digital samples (40 ms) for analysis by processor 208. Processor 208 is controlled by a program 210 stored in memory 212. Memory 212 may be RAM, ROM, or some other form of memory device, as known in the art. Processor 208 performs Goertzel analysis on the samples, and then processes the output of the Goertzel analysis for determination whether a call progress tone or DTMF digit is present in the signal. Goertzel analysis determines the amplitude of preselected fundamental frequencies, within determined deviations of the signal. Goertzel analysis is well known and documented in the art. See for example, Oppenheim & Schafer, *Digital Signal Processing*, Prentice-Hall, Inc., Englewood Cliffs, N.J., and Gay, et al., "Algorithms for Multi-Channel DTMF Detection for the WE ® DSP32 Family", International Conference on Acoustics, Speech and Signal Processing, 1989.

The frequencies of the output of the Goertzel analysis with the two highest amplitudes are then selected, and compared to the known DTMF and call progress tone frequency components. The amplitudes of the two selected frequencies are then tested against predefined thresholds corresponding to a candidate tone having the two selected frequencies. The candidate tone in the current frame is tested against candidate tones in previous frames for consistency. If the candidate tone is a DTMF digit and passed all of the tests, then the DTMF digit is returned. If the candidate tone is a call progress tone, the pattern of the candidate tone over a plurality of predetermined time periods is recorded and tested against known patterns of the candidate tone. If the candidate tone meets all of the above tests, the call progress tone is returned.

When processor 208 makes a determination whether a call progress tone or DTMF digit is present in the signal being analyzed, it transmits the determined tone or signal on communication channel 214. Communication channel 214 communicates the output from call progress tone detector 115 to a central control, which, in FIG. 1, is central control 111.

Figure 3:
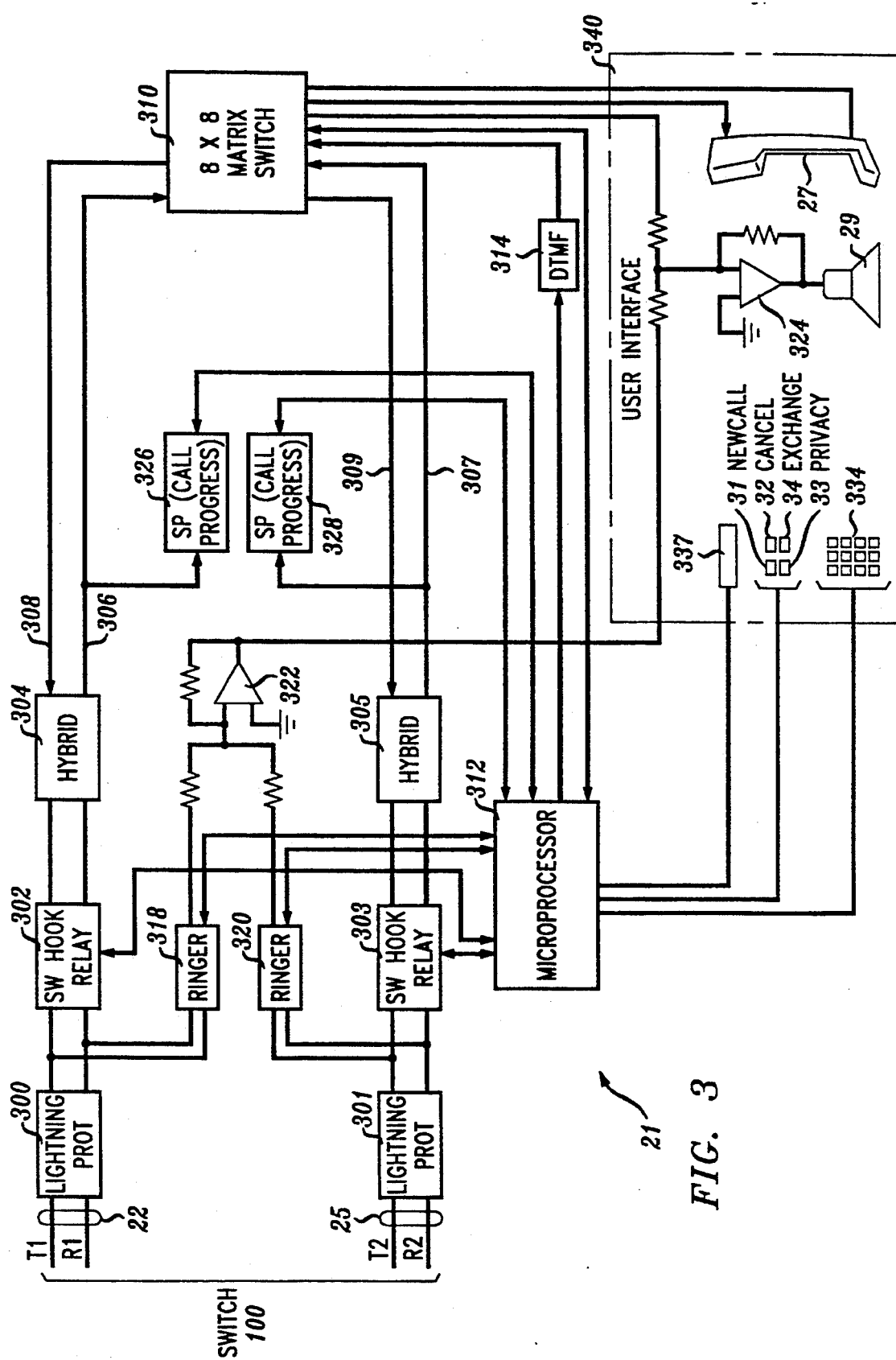
FIG. 3 is a block diagram of a telephone station set including a signal processor incorporating an exemplary method according to the preferred embodiment of this invention as shown in FIG. 1.

Turning now to FIG. 3, a block diagram of the main components of a telephone station set 21 is shown, wherein an exemplary embodiment of this invention is used to detect call progress tones. Two subscriber channels 22 and 25 connect telephone 21 to switch 100. In this embodiment of this invention, subscriber channels 22 and 25 are analog two-wire (tip and ring) channels, as is known in the art.

For purposes of this example, telephone 21 is connected through switch 100 and switch 190 to telephone 195. Tip-ring pair 22 delivers signals through lightning protection device 300 and switch hook relay 302. Switch hook relay 302 provides an off-hook indication to the network for channel 22. Signals are delivered from switch hook relay 302 to a two-wire converter circuit or hybrid 304. Hybrid 304 converts tip and ring (a full duplex connection to the telephone network) to a receive audio path 306 and a transmit audio path 308. Receive audio path 306 and transmit audio path 308 are connected to the inputs and outputs of an 8×8 matrix switch 310, respectively. Signals are delivered from matrix switch 310 to the handset earpiece and signals are received from the handset microphone and delivered back through the circuit to channel 22. Channel 25 has identically connected lighting a protection device 301, switch hook relay 303, hybrid 305, receiving 307, and transmitting 309 audio paths, connecting channel 25 to switch matrix 310.

Switch hook relays 203 and 303 provide on-hook and off-hook indication to the network under control of microprocessor 312. Microprocessor 312 also controls matrix switch 310 to deliver signals selectively from channels 22 and 25 to the handset 27 and/or speaker 29 and to channel 22 and/or 25 from the handset microphone. Microprocessor 312 further controls DTMF generator 314 to provide the full range of tones used in telephony.

Ringing signals are delivered from channels 22 and 25 to ringer circuits 318 and 320, respectively. Ringer circuits 318 and 320 provide an indication of an incoming call to microprocessor 312, and provides audible signals which are adjustable and programmable by microprocessor 312. The audible signals from ringer circuits 318 and 320 are summed at summing amplifier 322. The output of the summing amplifier 322 is delivered to a further summing amplifier 324 and an audible signal of a new call is given through speaker 29. User interface 340 provides the user with the controls of telephone 21 and provides the audio connection to and from the user.

Audible signaling tone recognition is provided by signal processors 326 and 328, according to an exemplary embodiment of this invention. Signal processors 326 and 328 are connected to the incoming lines after hybrid circuits 304 and 305, respectively. Signal processors 326 and 328 provide DTMF and call progress tone monitoring by receiving signals from incoming lines 306 and 307, and determine the amplitudes of preselected frequencies in a signal over a predetermined time period, and determine a candidate tone by selecting two of the preselected frequencies with the highest amplitudes and comparing the two selected frequencies to known DTMF and call progress tone frequency components. The amplitudes of the two selected frequencies are then tested against predefined thresholds corresponding to a candidate tone having the two selected frequencies. The candidate tone in the current time period is tested against candidate tones in previous time periods for consistency. If the candidate tone is a DTMF digit and passed all of the tests, then the DTMF digit is returned. If the candidate tone is a call progress tone, the pattern of the candidate tone over a plurality of predetermined time periods is recorded and tested against known patterns of the candidate tone. If the candidate tone meets all of the above tests, the call progress tone is returned. Signal processors 326 and 328 then translate the reported DTMF digit or call progress tone and provide the output to microprocessor 312.

In this embodiment of this invention, a 16 by 40 LCD display 37 is attached to microprocessor 312 through display drivers (not shown) as known in the art. Display 37 labels signaling buttons and/or provides a small display for using telephone station set 21 as a terminal. Display 37, in an alternative embodiment, may also be a small CRT or other means as known in the art.

Continuing with the example from FIG. 1, the user of telephone 21 is connected in a three-way call. Handset 27 is connected through matrix switch 210, hybrid 304 and 305, switch hook relays 302 and 303, and lightning protection circuits 302 and 303 to channels 22 and 25, respectively. A caller calls on channel 22. A call waiting tone is broadcast by switch 100 (FIG. 1) on channel 22 to telephone 21. The user of telephone 21 cannot determine whether the call waiting tone occurred on channel 22 or channel 25. However, SP 326 receives the call waiting tone. SP 326 processes the tone according to the method of the preferred embodiment, as described below, and reports the occurrence of the call waiting tone to microprocessor 312. Microprocessor 312 causes a call waiting indication to be displayed on display 37, and the user may then answer the call by using special buttons 31-34. The use of buttons 31-34 are described in Bennett-Klinger 1—1 U.S. patent application No. 07/576,541 and Bennett and Klinger, *Conceptual Models of Telephony and Their Implications for User Interface Design and Telecommunications Services*, in Proceedings, Human Factors in Telecommunications Conference, Turino, Italy, October, 1990.

Detection of call waiting tones is one example of the use of a call progress tone detector in a telephone station set. Detection of other call progress tones is useful as defined in the following table:

TABLE 3

| Dial tone | Active line, no other calls |
|---|---|
| Stutter dial tone | One call on hold, can dial next party |
| Busy, Reorder | Abandon call |
| Audible Ringing | When audible ringing is lost, it can be assumed that called party has answered |

Table 3 is intended to be illustrative of the uses of call progress tone detection in a telephone station set, and not inclusive. One skilled in the art may easily use the DTMF and call progress tone detector of the present invention for many purposes without departing from the scope of this invention.

Figure 4:
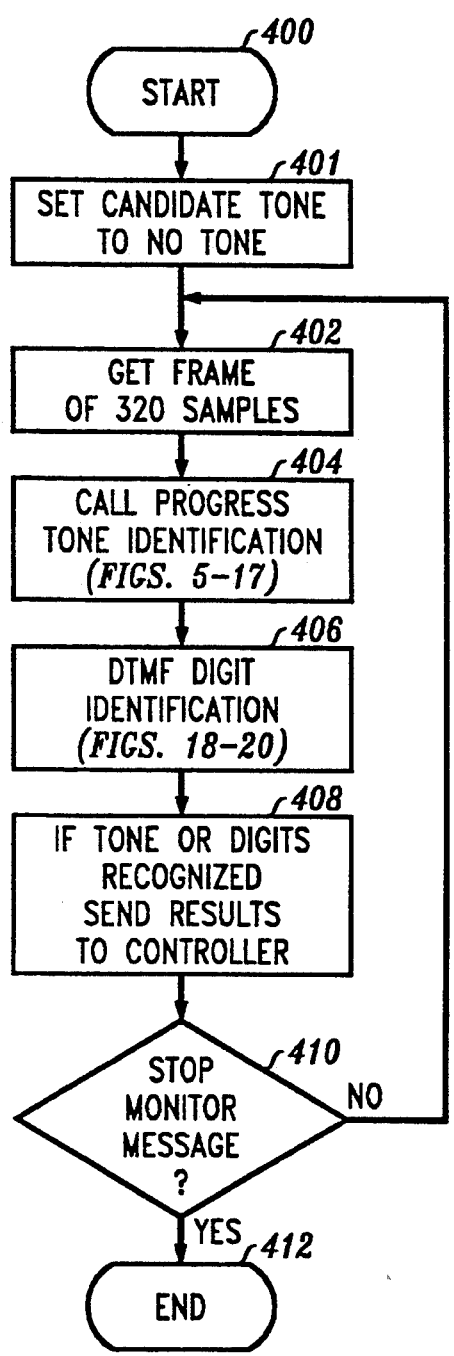

Turning now to FIG. 4, an overview of processing according to an exemplary embodiment of this invention is shown. In this FIG., and all figures where amplitude is tested, it is the square of the amplitude that is used, as is known in the art. Processing starts at 400 when processor 208 (FIG. 2) receives a message from the central controller to start monitoring the channel. Processing proceeds to box 401, where the candidate tone is initialize to no tone. Processing continues to box 402, where 320 samples are collected into a frame, for the preferred embodiment of this invention. 320 samples was chosen for the preferred embodiment of this invention because it comprises 40 ms., the minimum duration for recognized signaling tones. Processing proceeds to box 404, where the frame is analyzed for the presence of a call progress tone, and, if a tone is present, the identification of the tone. Processing continues to box 408, where the frame collected in box 402 is analyzed for the presence of a DTMF digit, and, if a DTMF digit is present, the identity of the digit. Processing continues to box 408 where, if a tone or digit was returned by either or both of the processing in boxes 404 and 406, then the tone or tones recognized are sent to the central controller.

Processing continues to decision diamond 410, where a test is made to determine whether a stop monitor message has been received from the central controller. If not, processing continues back to box 402, where the next 320 samples are obtained. If a stop monitor message has been received in decision diamond 410, then processing ends at circle 412.

Figure 5:
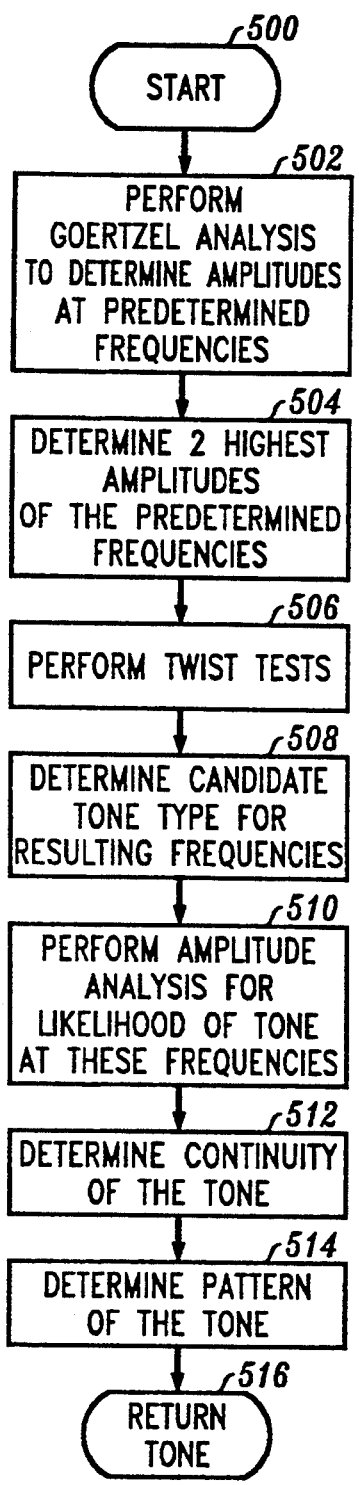

Turning now to FIG. 5, a block diagram of the high-level structure of a method of operation of a call progress tone detector according to the preferred embodiment of this invention is shown. Each of the blocks of FIG. 5 is expanded into one or more flow charts in subsequent FIGS. Processing starts at 500 and continues to block 502 where processor 208 determines the amplitudes of the predetermined frequencies of call progress tones (see table 2, supra), by performing Goertzel analysis on the signal data accumulated in buffer 206.

Processing continues to block 504 wherein processor 208 selects the two highest amplitudes of the predetermined frequencies (as determined in block 502, above). Next, in box 506, processor 208 performs the twist and reverse twist tests. The difference between the amplitudes of the two selected frequencies are compared to threshold values to determine if it is likely that these amplitude spikes represent signals, as opposed to noise (i.e., human speech or music). The closer the amplitudes (the lower the difference between the two amplitudes), the more likely that the signal at the predetermined frequency is not noise. Also, processor 206 determines whether it is likely that one tone or two tones are present in the signal.

Next, in block 508, processor 206 compares the selected frequencies to a table of predetermined call progress tone frequency components (Table 2) stored in memory 212 to determine a candidate tone. If there is not a tone defined at the intersection of the two frequencies, then the candidate tone is set to no tone. Otherwise, the candidate tone is set to the tone type defined at the intersection of the two frequencies.

Processing proceeds to box 510, where processor 206 compares the amplitude of the two frequencies that make up the candidate tone to predetermined amplitude thresholds, based on the candidate tone. For example, if the candidate tone is dial tone, then the amplitude threshold is relatively high. If the candidate tone is call waiting, the amplitude threshold is low. Furthermore, the energy of the frame is compared to an energy threshold. In order for a candidate tone to be likely to be present, it should have component frequencies with amplitudes greater than the predetermined thresholds, and a total frame energy above the energy threshold.

Processing continues to block 512, where processor 208 determines the continuity of the candidate tone, based on the current frame and the two previous frames stored in memory 212. If the same candidate tone is present in more than one of the three frames, it is likely that the tone is present. Processor 208 then stores the candidate tone of the current frame in memory 212.

Processing continues to block 514 where processor 208 checks the pattern (i.e., steady or stutter) of the candidate tone. Certain call progress tones also have cadences, such as busy and fast busy, which must be measured to determine which tone is present. Processing continues to block 516 where processor 208 derives the meaning of the tone from the above information. At this point, if a candidate tone is still likely to be present, a call progress tone (busy, reorder, ringing, etc.) has been determined, and a representation of the call progress tone is returned to the control unit.

Figure 6:
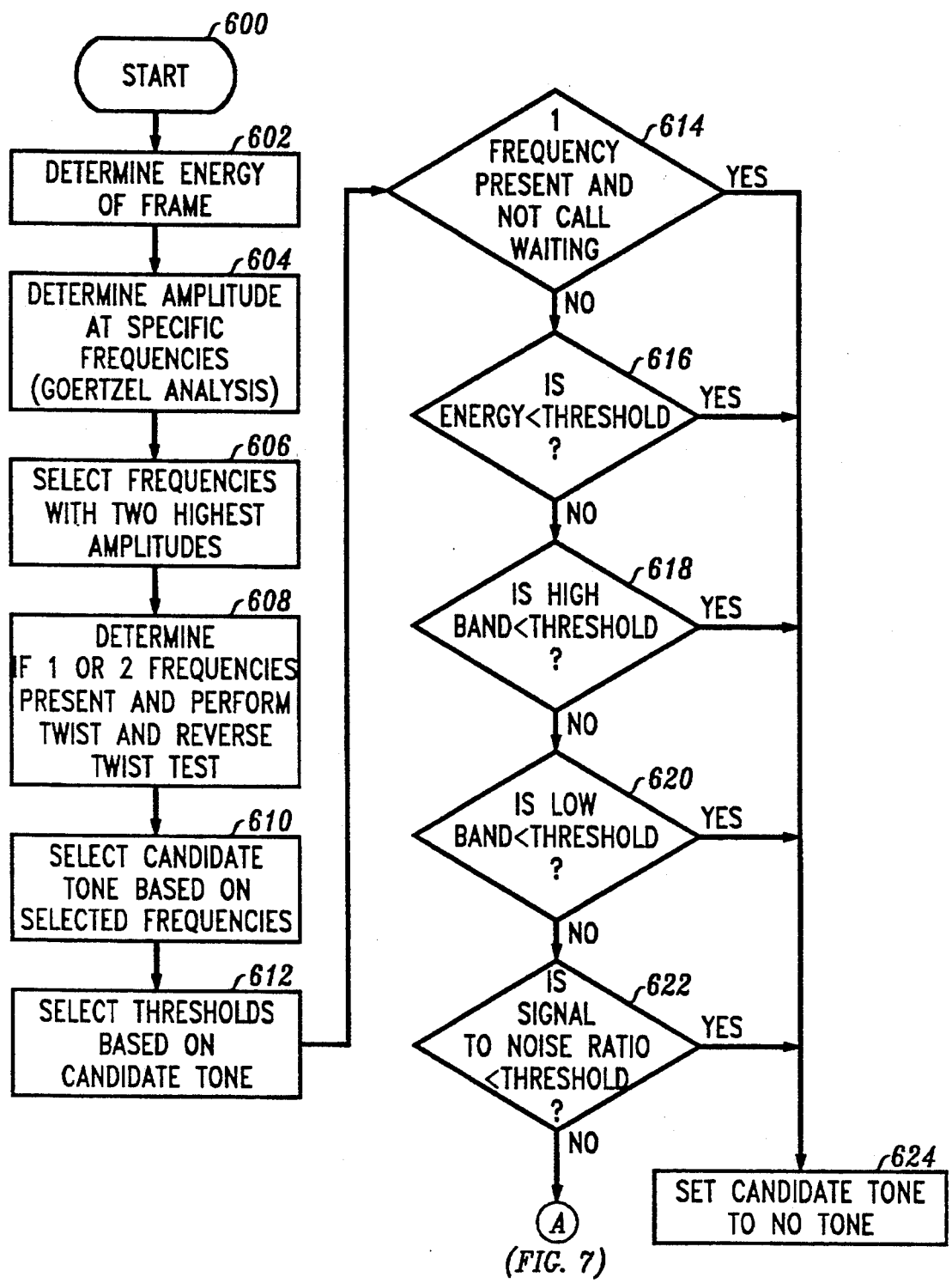

Turning now to FIG. 6, a flow chart is shown describing the processing for FIG. 5, blocks 502–510. Processing starts at 600, and proceeds to block 602, where the total energy for the frame is determined. The total energy for purposes of this embodiment is the sum of the squares of the samples in the frame. Processing continues to block 604, where amplitudes of the preselected frequencies of call progress tones (e.g., 350 Hz, 440 Hz, 480 Hz, and 620 Hz) are determined by Goertzel analysis. Next, in block 606, the two frequencies in the frame with the highest amplitudes are selected by comparing the amplitude at the preselected frequencies to each other.

Processing continues to block 608 where a determination is made if one or two frequencies are present in the signal. For this exemplary embodiment of this invention, if the ratio of the amplitude of higher selected frequency over the amplitude of the lower selected frequency exceeds the twist test, then only one tone is deemed to be present in the frame. Likewise, if the ratio of the amplitude of the lower frequency over the amplitude of the higher frequency is greater than the reverse twist ratio, then only one frequency is deemed to be present with the frame.

Processing continues to block 610, where a candidate tone is selected. Since the frequencies examined in the Goertzel analysis were selected because they correspond to the frequencies of call progress tones, the tones may be indexed into a table relating the two selected frequencies to call progress tones. Other methods of determining the tone or tones may be used without departing from the scope of this invention.

Processing continues to box 612 where amplitude thresholds are selected based on the candidate tone. If the candidate tone is dial tone, the selected frequencies must have higher amplitudes than other call progress tone. Two amplitude thresholds are set. The amplitude thresholds depend on whether the candidate frequencies with the highest amplitudes reflect a dial tone. If they do, special values of these thresholds are set at approximately 12 dB. Otherwise, standard thresholds are set at approximately 4 dB.

Processing continues to decision diamond 614, where a test is made to determine whether one frequency is present as determined in box 608, and if so, if the candidate tone is call waiting. If only one frequency is present and the candidate tone is not call waiting, then no tone is possible and the candidate tone is set to no tone. If the candidate tone comprises two frequencies or is one frequency and call waiting, then processing proceeds to decision diamond 616.

In decision diamond 616, a test is made to determine if the total energy of the frame is greater than a predefined threshold. In this test, if the energy is not greater than the threshold, then any tone that may have been detected is probably noise, and processing ends at circle 624, where no tone has been detected.

If the energy of the frame is greater than the predefined threshold, then a test is made in decision diamond 618 to determine whether the amplitude of the higher band frequency is lower than the predefined threshold, then processing ends in box 624 where no tone is returned. If the amplitude of the higher band frequency is above the predetermined threshold, then processing continues to decision diamond 620, where a test is made to determine whether the amplitude of the lower band frequency is above a predetermined threshold. If the amplitude is below the predefined threshold, then no tone has been detected and processing ends at 624.

If the amplitude of the lower band frequency is above a predetermined threshold, then processing continues to decision diamond 622, where a test is made whether the signal-to-noise ratio is above a predetermined threshold. The signal-to-noise ratio is the sum of the amplitude of the lower band frequency squared and the amplitude of the higher band frequency squared over the frame's total energy.

If the signal to noise ratio is below the predetermined threshold, then processing ends in box 326 where no tone is returned. If the signal to noise ratio is above the predetermined threshold, then it is more likely that a call tone is present. Processing proceeds to connector A.

Figure 7:
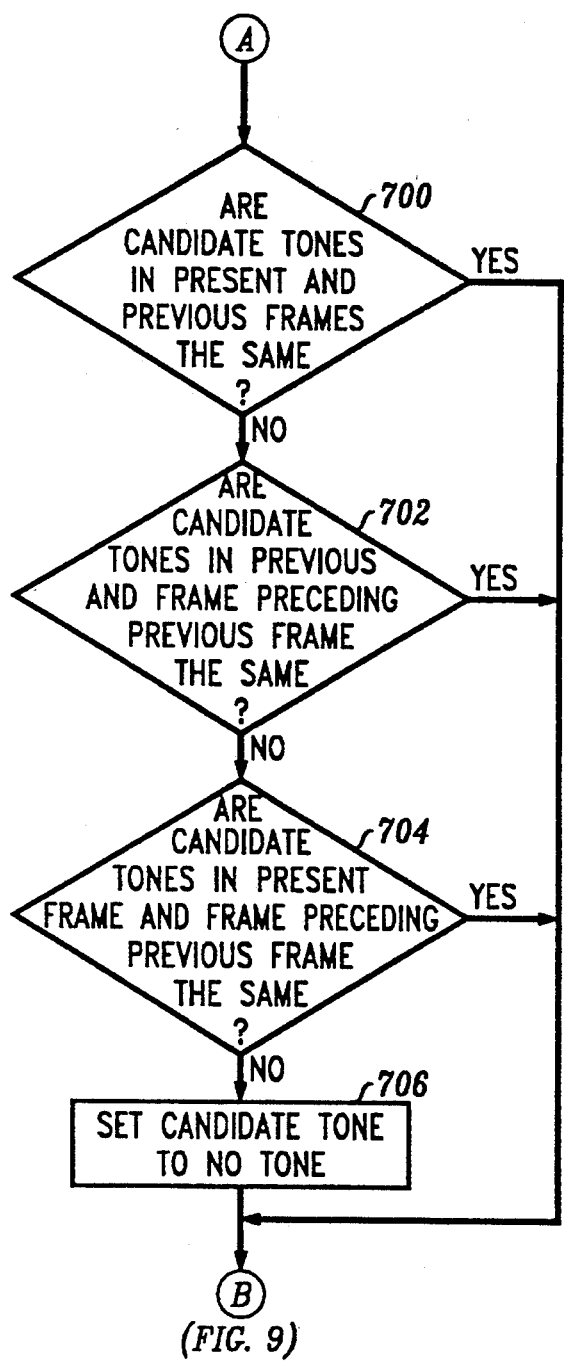

Turning now to FIG. 7, processing according to block 512, FIG. 5, is shown. In this routine, the candidate tone in three adjacent frames is examined for consistency. If the same candidate tone is present in two of three adjacent frames, then it is more likely that a tone has been detected. To this end, processing begins through connector A and proceeds to decision diamond 700, where a test is made to determine whether the candidate tone in the current frame and the candidate tone in the previous frame are the same (and not no tone). If they are the same, then it is increasingly likely that a tone is present, and processing continues through connector B.

If, in decision diamond 700, the candidate tone in the current frame and the candidate tone in the previous frame are not the same, then processing proceeds to decision diamond 702, where a test is made to determine whether the candidate tone in the previous frame and the candidate tone in the frame preceding the previous frame are the same. If they are the same, then it is likely that the candidate tone in the previous frame is present, and then the tone ceased, and processing continues through connector B. If, in decision diamond 702, the candidate tone in the previous frame and the candidate tone in the frame preceding the previous frame are not the same, then processing proceeds to decision diamond 704, where a test is made to determine whether the candidate tone in the current frame and the candidate tone in the frame preceding the previous frame are the same. If they are the same, then it is likely that a tone was present, ceased, and then came back on in a cadence. Processing proceeds through connector B. If the current tone and the tone before the previous tone were not the same, then it is not likely that a tone is present and the candidate tone is set to no tone. Processing proceeds through connector B.

Figure 8:
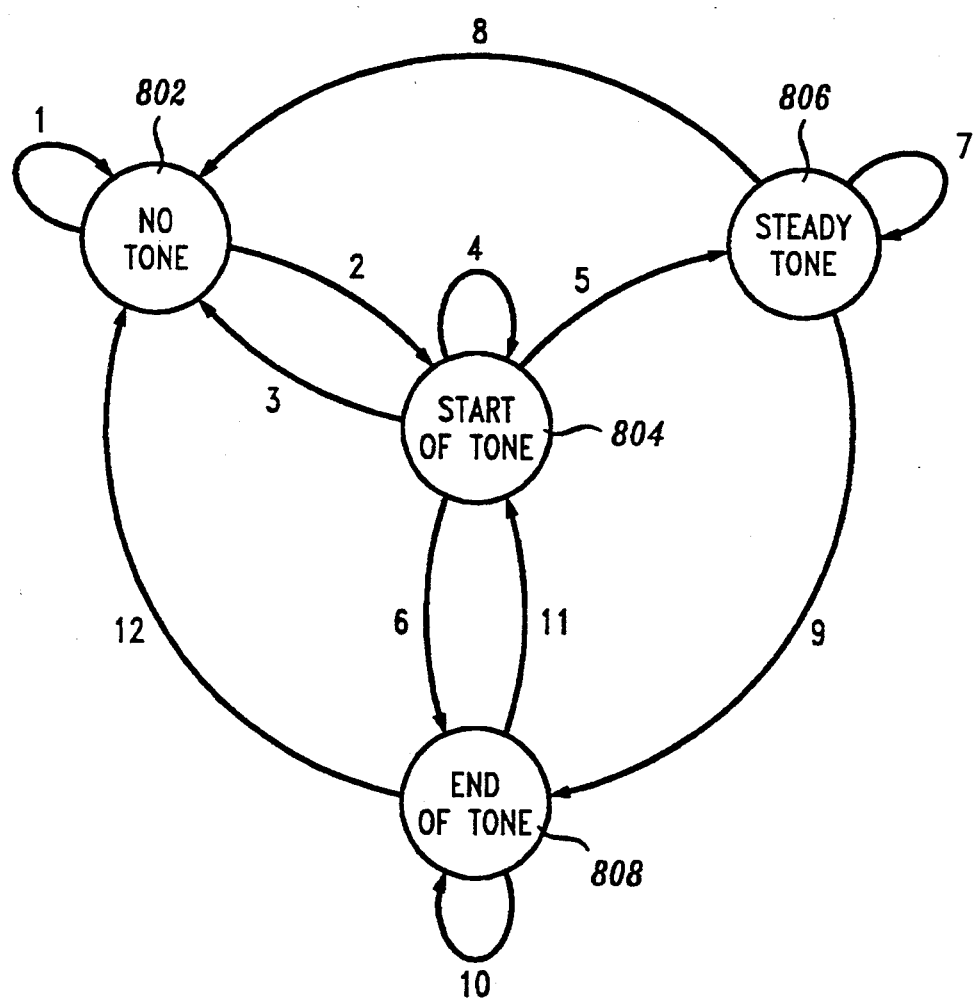

A determination is then made as to what state the tone is in the current frame. FIG. 8 shows a state table illustration the four permitted states and the transitions from one state to another. Processing states in the no tone state 802. Processing may only transition from the no tone state 802 to the no tone state 502, or to the start of tone state 804. This latter transition occurs when a candidate tone other than no tone is determined to be likely in the processing of FIGS. 8 and 9.

There are four transitions from the start of tone state 804. A first transition is from the start of tone state to the start of tone state. A second transition occurs when the same tone has been detected in several adjacent frames, and the state changes to the steady tone state 806. A third transition occurs when the tone stops, and the state changes to the end of tone state 808. Finally, if the pattern is not consistent, the start of tone state 804 may transition back to the no tone state 802.

From the steady tone state 806, there is a transition to the steady tone state 806 and to the end of tone state 808. These occur when a candidate tone either stays the same or ends, respectively. The end of tone state 808 has three transitions. A first transition is from the end of tone state 808 to the end of tone state 808. A second transition is from the end of tone state 808 to the start of tone state 804, which occurs when a new tone is detected. A third transition is from the end of tone state 808 to the no tone state 802.

Figure 9:
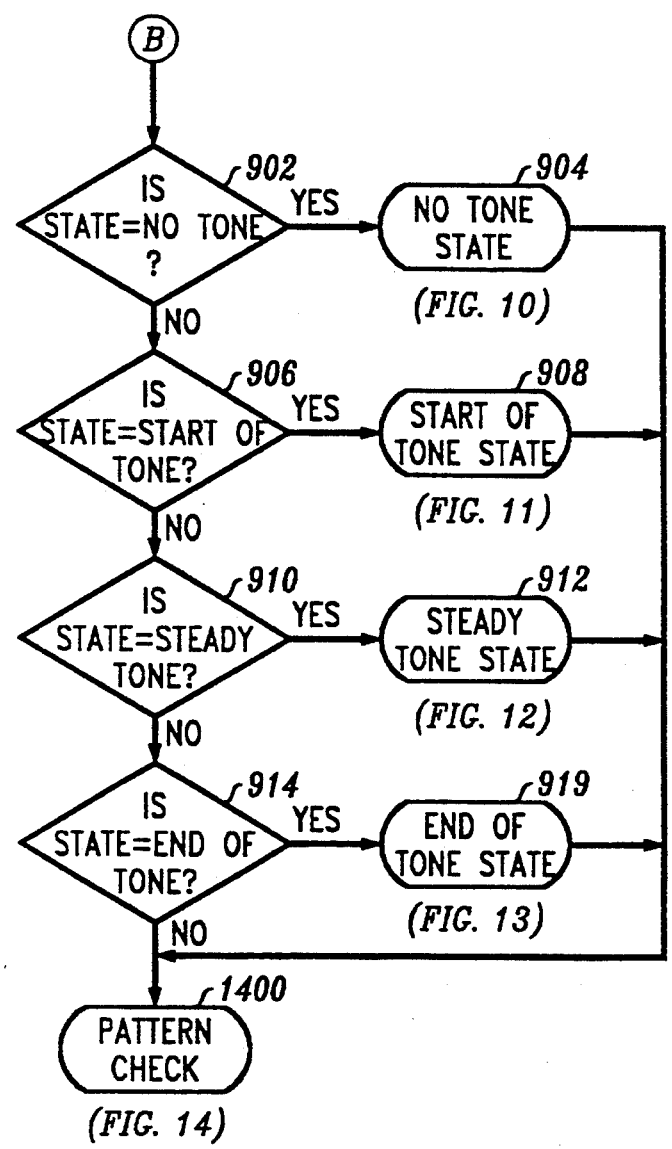
Figure 14:
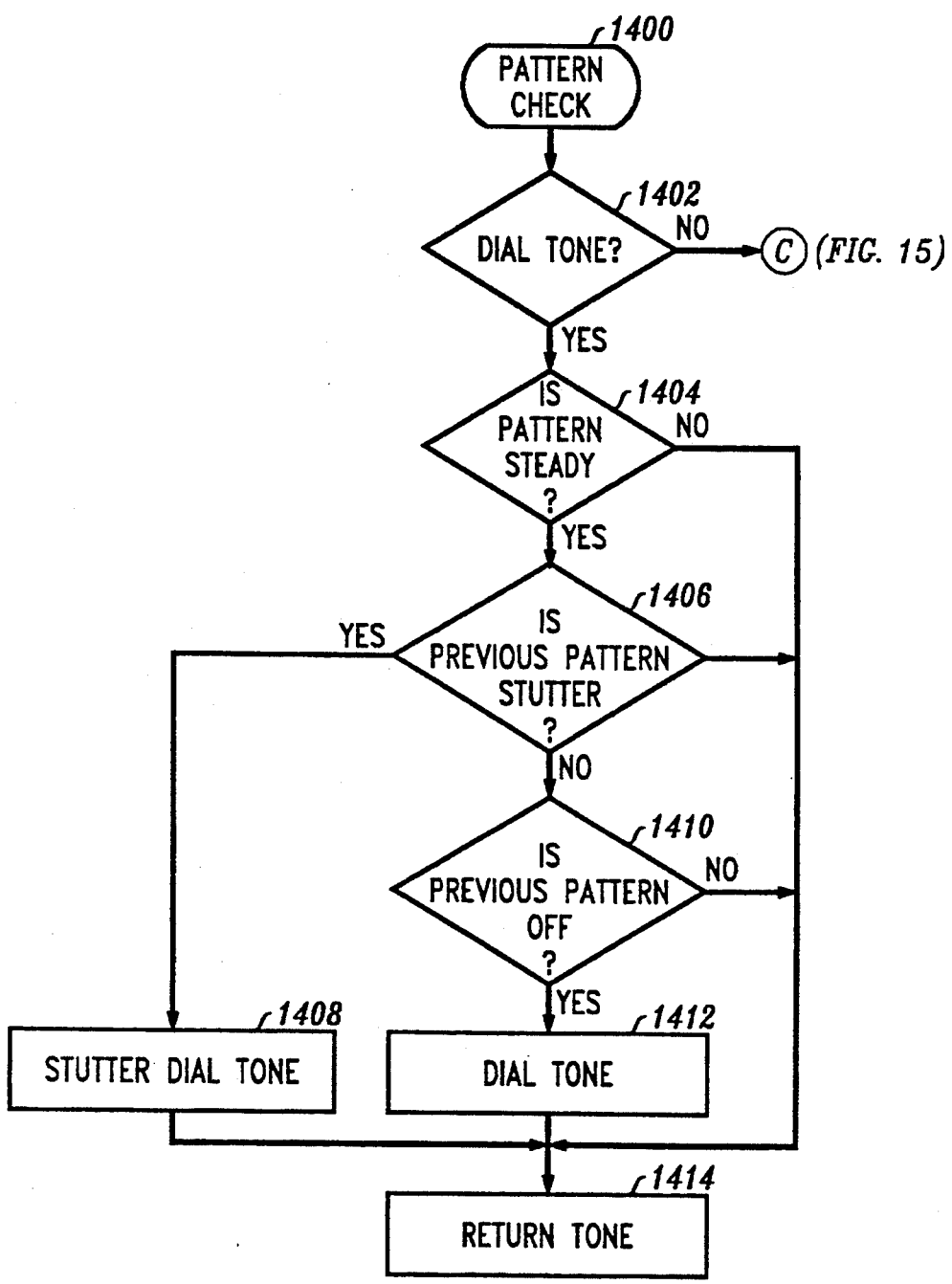

Turning now to FIG. 9 a flow chart of processing in the no tone state is shown. Processing enters through connector B and proceeds to decision diamond 902, where a determination is made whether the current state is no tone. If the current state is no tone, then processing continues to no tone state processing oval 904, FIG. 10. If the state is not no tone, then processing continues to decision diamond 906, where a determination is made whether the state is tone start. If the state is tone start, then processing continues to oval 908, tone start state processing, FIG. 11. If the state is not tone start, then processing proceeds to decision diamond 910, where a test is made to determine whether the current state is steady tone. If the state is steady tone, then processing continues to oval 912, for steady tone state processing FIG. 12. If the state is not steady tone, then processing continues to decision diamond 914, where a test is made to determine whether the state is end of tone. If the state is end of tone, then processing continues to oval 919, for end of tone state processing. Processing continues through connector 1400, where the pattern of the sequel is checked (FIG. 14).

Figure 10:
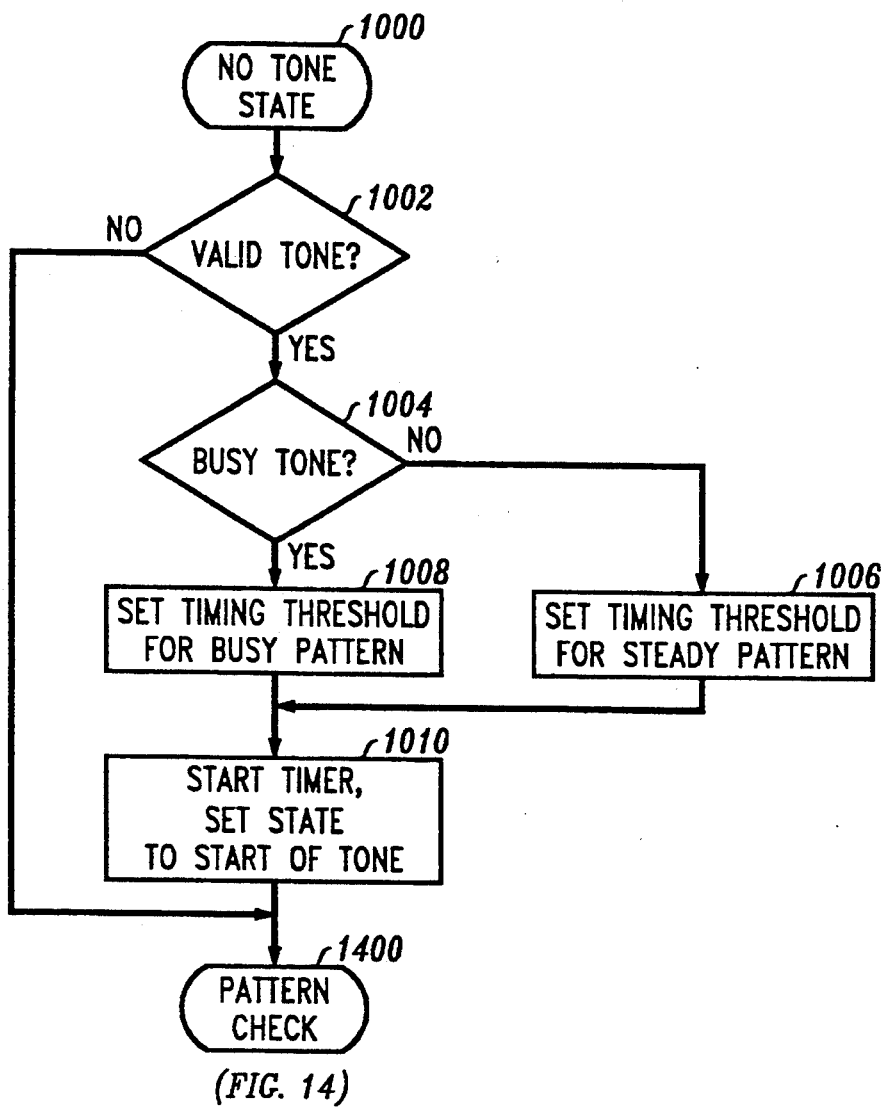

Turning now to FIG. 10, processing in the no tone state is shown. Processing starts at 1000, and proceeds to decision diamond 1002, where a test is made to determine whether a candidate tone other than no tone is likely to be present. If a tone is not likely to be present, then processing continues to oval 1400, FIG. 14, where the pattern of the tone is checked. If, in decision diamond 1002, it is likely that a tone is present, then processing proceeds to decision diamond 1004, where a test is made to determine whether the candidate tone is a "busy" call progress tone. If the candidate tone is "busy," then a different pattern may be expected, and a cadence (or timing) threshold is set in box 1008 to reflect the timing of the busy signal. If, in decision diamond 1004 the candidate tone is not "busy," then processing proceeds to box 1006, where a timing threshold is set to a longer period (steady tone). Processing from both branches continues at box 1010, where a timer for timing the length of the tone is started, and the transition to the tone start state is set. Processing continues through oval 1400, FIG. 14, where the pattern of the candidate tone is checked.

Figure 11:
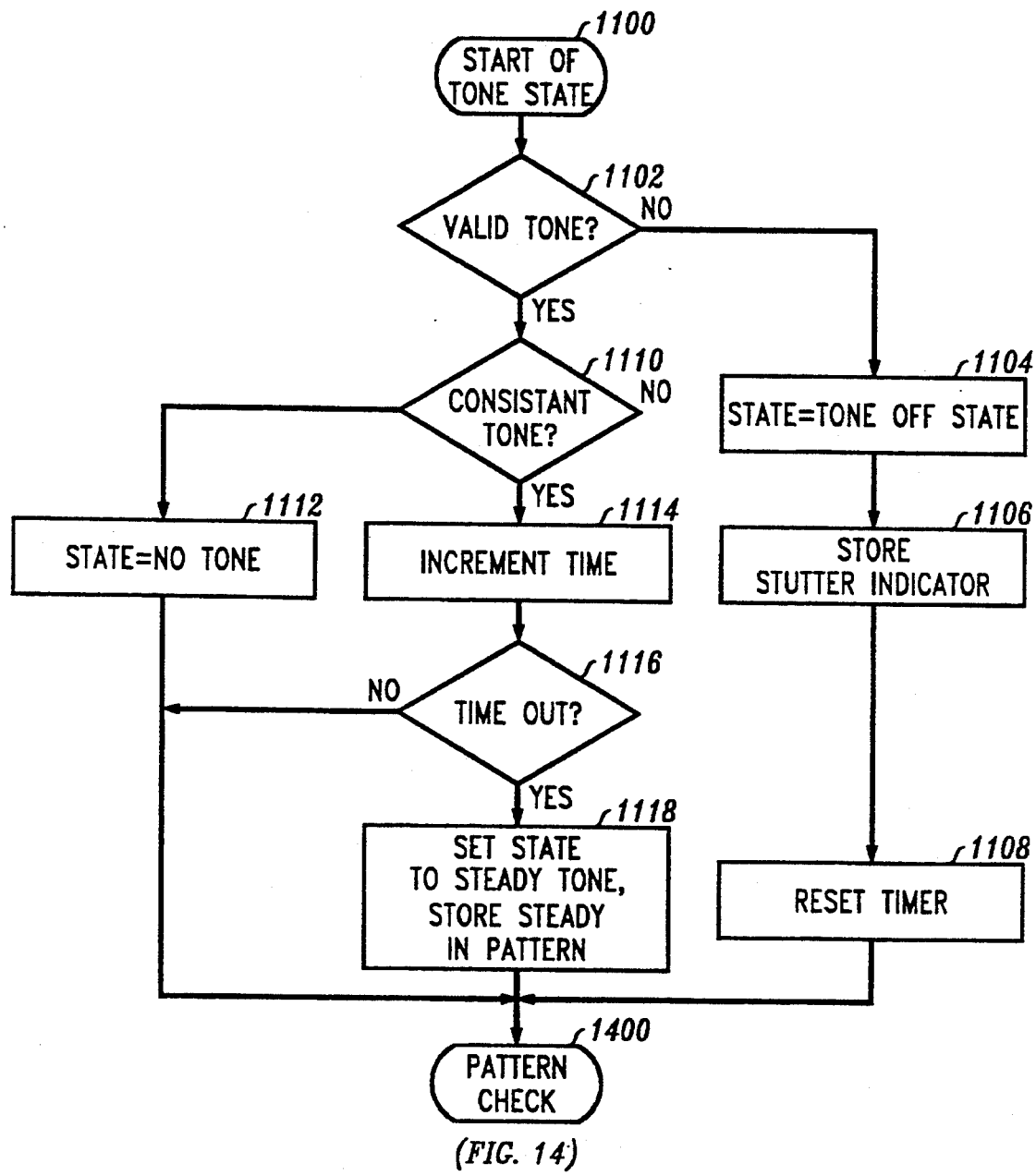

Turning now to FIG. 11, processing for the start of tone state is shown. Processing for the tone start state begins at 1100, and proceeds to decision diamond 1102. In decision diamond 1102, a test is made to determine whether the candidate tone is any tone other than no tone. If no tone is present, then the tone went off, and processing continues to box 1104, where the state is set to transition to the tone off state. Processing continues to box 1106, where the pattern is set to indicate that the pattern may be stutter, which is a valid pattern for dial tone and call waiting tones. Processing proceeds to box 1108, where the timer is reset, and processing proceeds to oval 1400, FIG. 14, where the pattern is checked.

If, in decision diamond 1102 a valid tone is still present, then processing proceed to decision diamond 1110, where a determination is made whether the candidate tone is consistent between this frame and the previous frame. If the candidate tone is not consistent, then it is not likely that a tone has been detected, the state is set to transition to the no tone state in box 1112, and processing proceeds to oval 1400, FIG. 14 where the pattern is checked. If the tone is found to be consistent between the two adjacent frames in decision diamond 1110, then processing proceeds to box 1114 where the timer is incremented, and then to decision diamond 1116. In decision diamond 11116, a test is made to determine whether the time in the timer is greater than the threshold of an expected tone, as set in FIG. 10, boxes 1006 and 1008. If it is not, then the tone cannot yet transition to the steady state, and processing proceeds to oval 1400, FIG. 14, for the pattern check.

If, in decision diamond 1116, the time is greater than the threshold for an expected tone, then it is more likely that a steady tone has been detected and processing proceeds to box 1118, where the pattern is updated to steady and a transition is set to the steady state. Processing proceeds to circle 1118, FIG. 14, for the pattern check.

Figure 12:
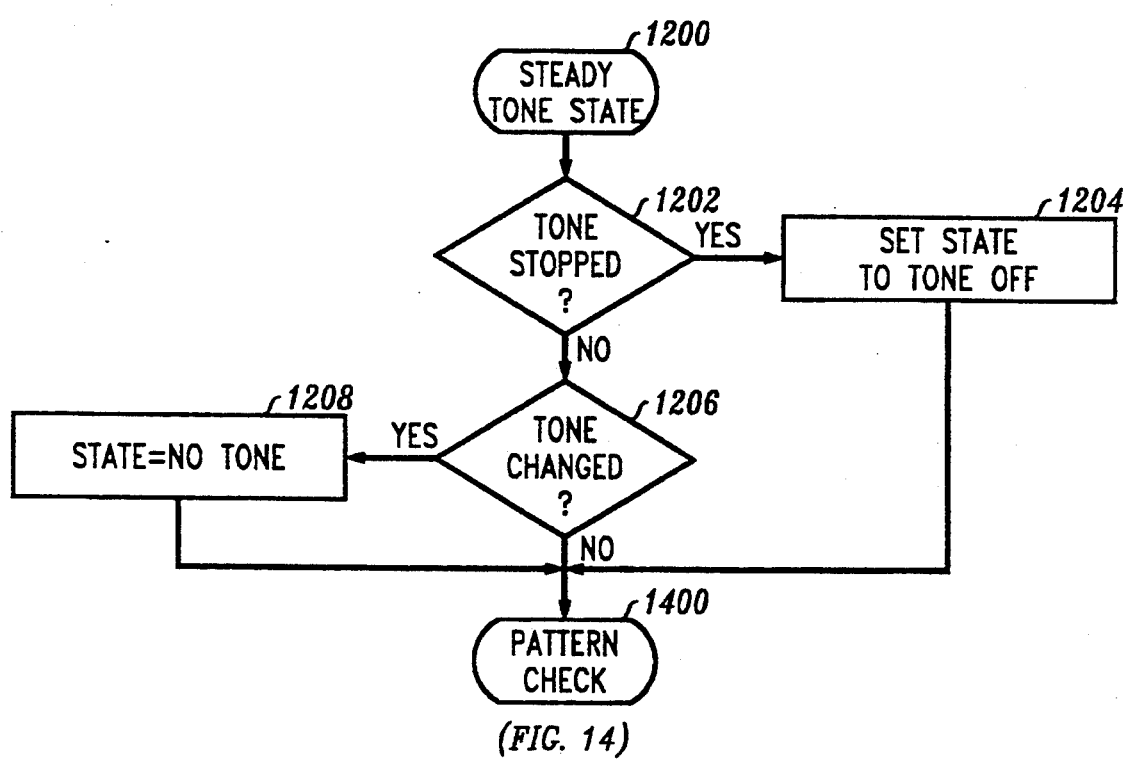

Turning now to FIG. 12, processing is shown for the steady tone state. Processing starts at 1200, and proceeds to decision diamond 1202 where a test is made to determine whether the candidate tone has stopped. If the candidate tone has stopped, then processing continues to box 1204 where the state is set to the tone off state and the timer is reset. Processing then continues to oval 1400, FIG. 14.

If, in decision diamond 1202, a candidate tone is present, then processing proceeds to decision diamond 1206 where a test is made to determine whether the candidate tone has changed. If the candidate tone has changed then it is not likely that a call progress tone has been detected, and the state is set to transition to the no tone state in box 1208. Processing then proceeds to oval 1400, FIG. 14, for the pattern check. If the tone has not changed as determined in decision diamond 1206, then processing proceeds to oval 1400, FIG. 14.

Figure 13:
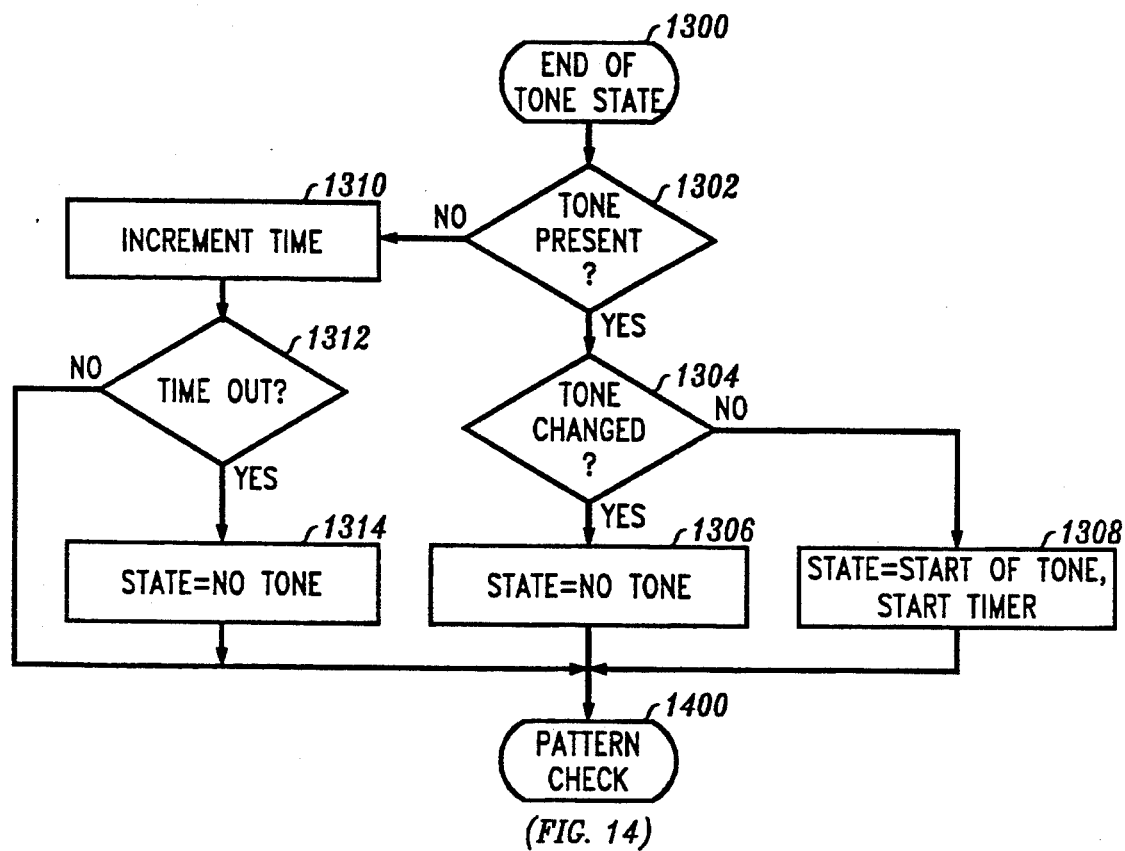

Turning now to FIG. 13, processing is shown for the end of tone state. Processing starts at 1300 and proceeds to decision diamond 1302, where a test is made to determine whether the candidate tone is stopped. If the candidate tone did not stop, then processing proceeds to decision diamond 1304, where a test is made to determine whether the candidate tone changed. If the candidate tone changed, then it is unlikely that a call progress tone is present, and the state is set to transition to the no tone state in box 1306. If the candidate tone did not change, then a pattern is detected where the tone was on, stopped and now restarted. Processing proceeds to box 1308, where the state is set to transition to the start of tone state, and the timer is reset. Processing for both of these legs proceeds through oval 1400, FIG. 14, pattern check.

If, in decision diamond 1302, the candidate tone is no tone, then processing proceeds to box 1310, where the timer is incremented. Processing continues to decision diamond 1312, where a test is made to determine whether the candidate tone has been off for longer than the threshold set in FIG. 10, box 1006 and 1008. If the timer timed-out, then it is unlikely that the candidate tone is a call progress tone, and the state is set to the no tone state in box 1314. If the timer did not time out, then no determination can be made regarding the candidate tone. Processing continues through oval 1400, FIG. 14, to check the pattern.

Turning now to FIG. 14, processing according to FIG. 2, block 214 is shown. In this figure, the final stage of processing of call progress tones is described, where the most likely call progress tone is determined. Processing enters through oval 1400, and proceeds to decision diamond 1402, where a test is made to determine whether the candidate tone is dial tone. If it is, then processing proceeds to decision diamond 1404, where the pattern is tested to determine whether the tone is steady. If the tone is steady, then processing proceeds to decision diamond 1406, where a test is made to determine whether the preceding pattern is stutter. If the preceding pattern is stutter, then the candidate is likely to be stutter dial tone. Processing proceeds to box 1408, where the output of the process is set to stutter dial tone, and processing proceeds to circle 1414, where the tone is returned.

If, in decision diamond 1406, the pattern was not stutter, then processing proceeds to decision diamond 1410, where a test is made to determine whether the previous pattern is off, indicating that the tone was steady for its duration. If the previous pattern was off, then dial tone is detected, and processing proceeds to box 1412, where the output is set to dial tone. Processing proceeds to box 1414, where the tone is returned. If, in decision diamond 1410, the previous pattern is not off, then a determination cannot be made at this time whether a call progress tone is present, and processing proceeds to circle 1414, where no tone is returned.

Figure 15:
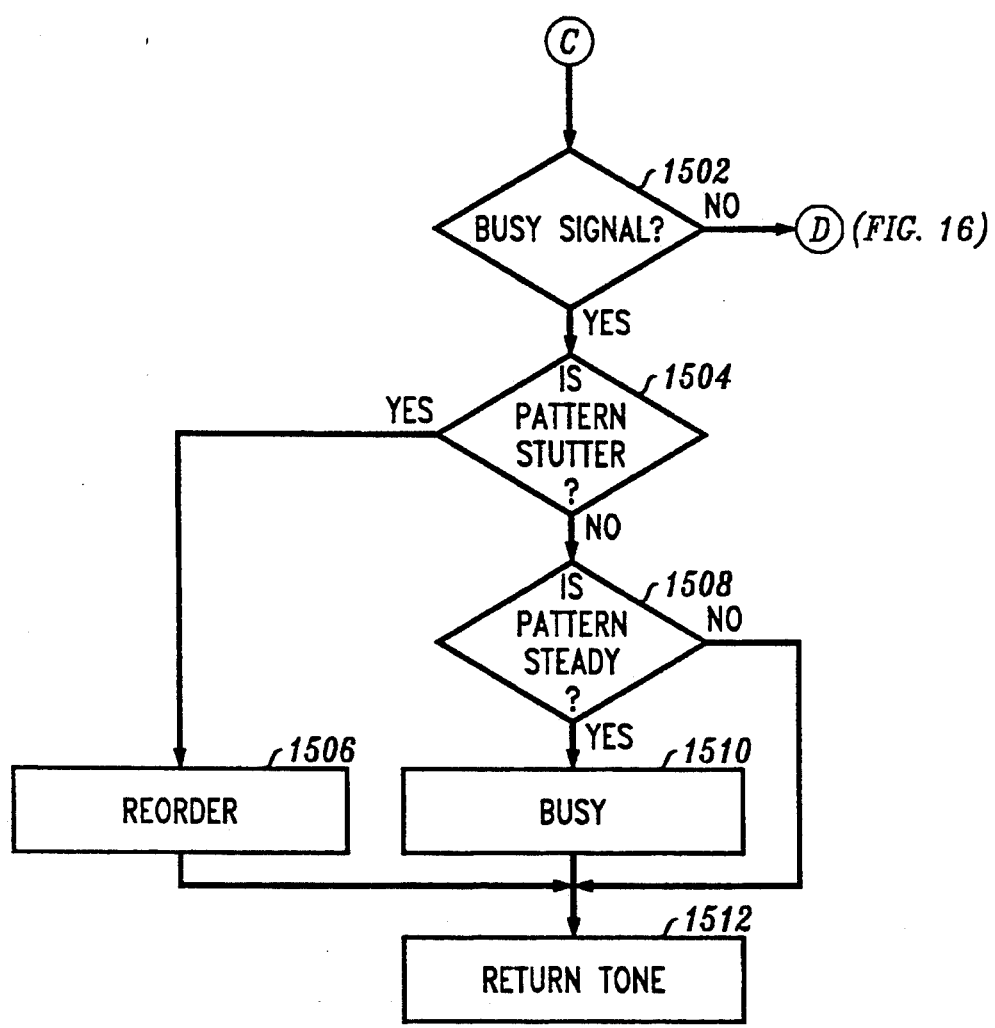

If, in decision diamond 1402, the candidate tone is not "dial tone", then processing proceeds to FIG. 15. In FIG. 15, processing proceeds to decision diamond 1502, where a test is made to determine whether the candidate tone is "busy." If the candidate tone is "busy", then processing proceeds to decision diamond 1504, where the pattern is checked for stutter. If the pattern is stutter, then a "reorder" or "fast busy" tone is present, the return value is set to "reorder," in box 1506 and the tone is returned in box 1512.

If, in decision diamond 1504, the pattern is not stutter, then processing proceeds to decision diamond 1508, where a test is made whether the pattern is steady. If the pattern is steady, then a "busy" signal is detected, the return value is set to "busy" in box 1510, and the tone is returned in box 1512.

Figure 16:
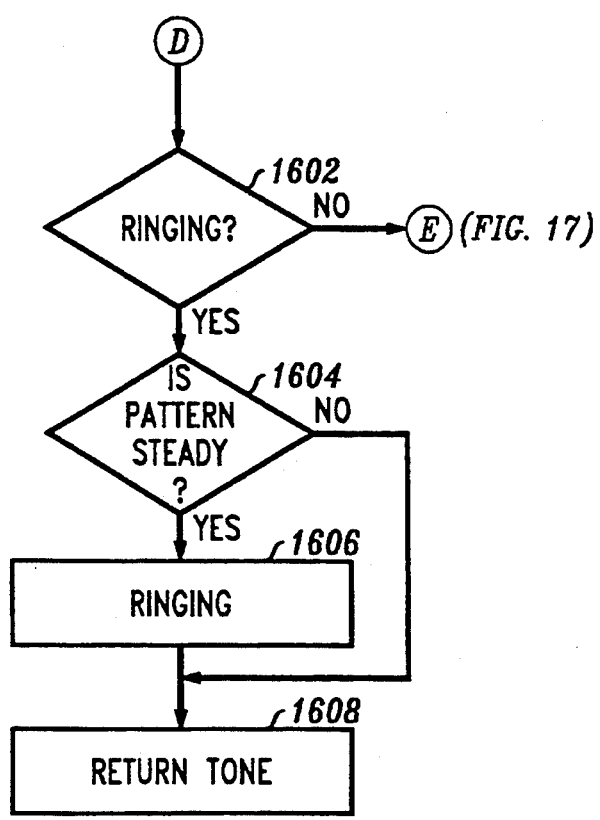

If, in decision diamond 1502, the candidate to tone is not "busy," then processing proceeds through connector D to FIG. 16. In FIG. 16, processing starts at decision diamond 1602, where a test is made to determine whether candidate tone is "ringing." If it is, then processing proceeds to decision diamond 1604, where a test is made to determine whether the pattern of the signal is steady. If the pattern is steady, then a "ringing" signal has been detected, and the output is se to ringing in box 1606. If the pattern is not steady, then no conclusion can be drawn yet, and processing proceeds to box 1608, the tone is returned.

Figure 17:
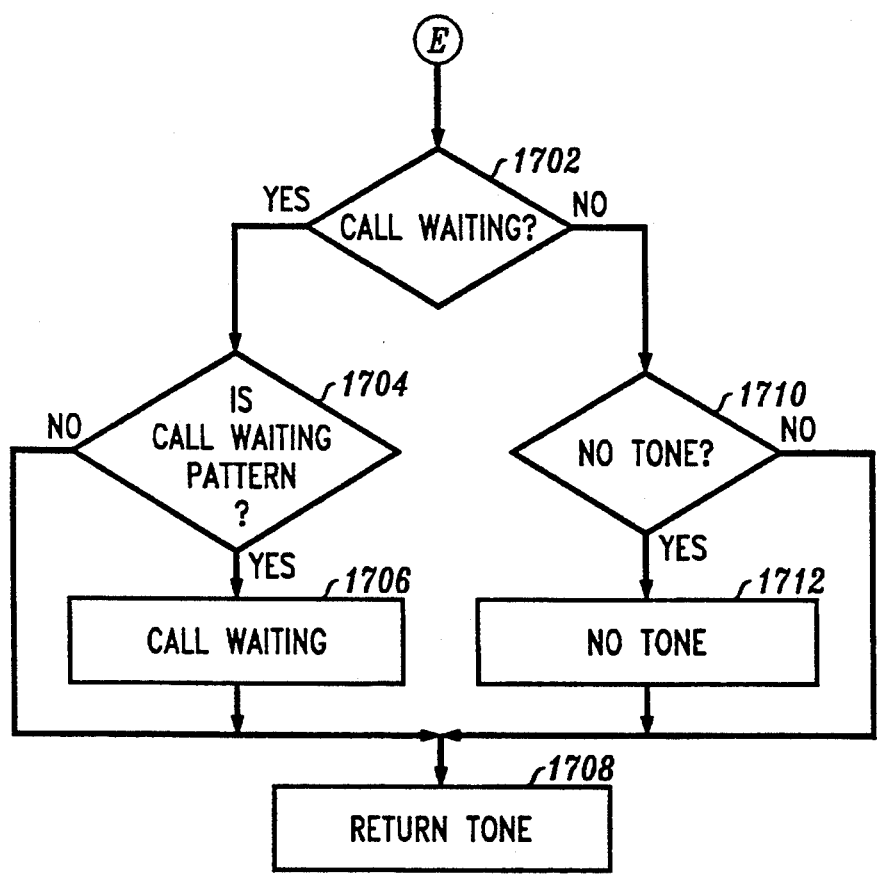

If, in decision diamond 1602, the candidate tone is not "ringing," then processing proceeds through connector E to FIG. 17. In FIG. 17, processing starts in decision diamond 1702, where a test is made to determine whether the candidate tone is "call waiting." If it is, then processing proceeds to decision diamond 1704, where a test is made to determine whether the pattern is that of call waiting. Since there may be several call waiting patterns, it is within the ability of one skilled in the art to check the pattern of the tone and determine which of the several call waiting tones is present. If the pattern is that of one of the call waiting tones, then the output is set to the appropriate call waiting tone in box 1706, and the tone is returned in box 1708. If the pattern is not one of the recognized call waiting tones, then no conclusion can be drawn at this time, and processing proceeds to box 1708, where no tone is returned.

If, in decision diamond 1702, the candidate tone is not "call waiting," then processing proceed to decision diamond 1710, where a test is made to determine whether the candidate tone was no tone. If it is not a tone, then the output is set to "no tone" in box 1712, and processing proceeds to box 1708, where the tone is returned.

Figure 18:
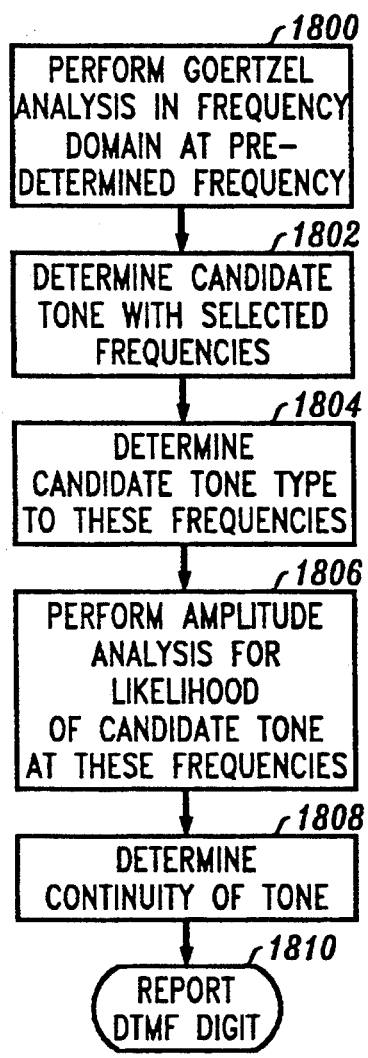

Turning now to FIG. 18, a block diagram illustrating the processing of DTMF signals is shown. Detection of DTMF signals proceeds in the same fashion as detection of call progress tones. Since there is no cadence or pattern of on and off in DTMF signaling, the detection process is shorter than in detection of call progress tones. Processing starts in block 1800, where processor 208 determines the amplitude of the preselected frequencies of DTMF digits (see table 1, supra), by performing Goertzel analysis on the frame of signal data accumulated in buffer 206. Processing continues to block 1802, where processor 208 determines the two highest amplitudes of the DTMF frequencies. Next, in block 1804, processor 208 selects a candidate tone by indexing the two selected frequencies with the highest amplitudes into a table of DTMF frequency components in memory 212. Processing continues to block 1806 where processor 206 determines if the energy and amplitude of the tone are above predetermined thresholds. Next, block 1808, processor 208 determines whether the candidate tone is continuously present in more than one of the last three adjacent frames. Finally, in block 1810, processor 208 reports the detected DTMF digit, if present, on communication channel 214.

Figure 19:
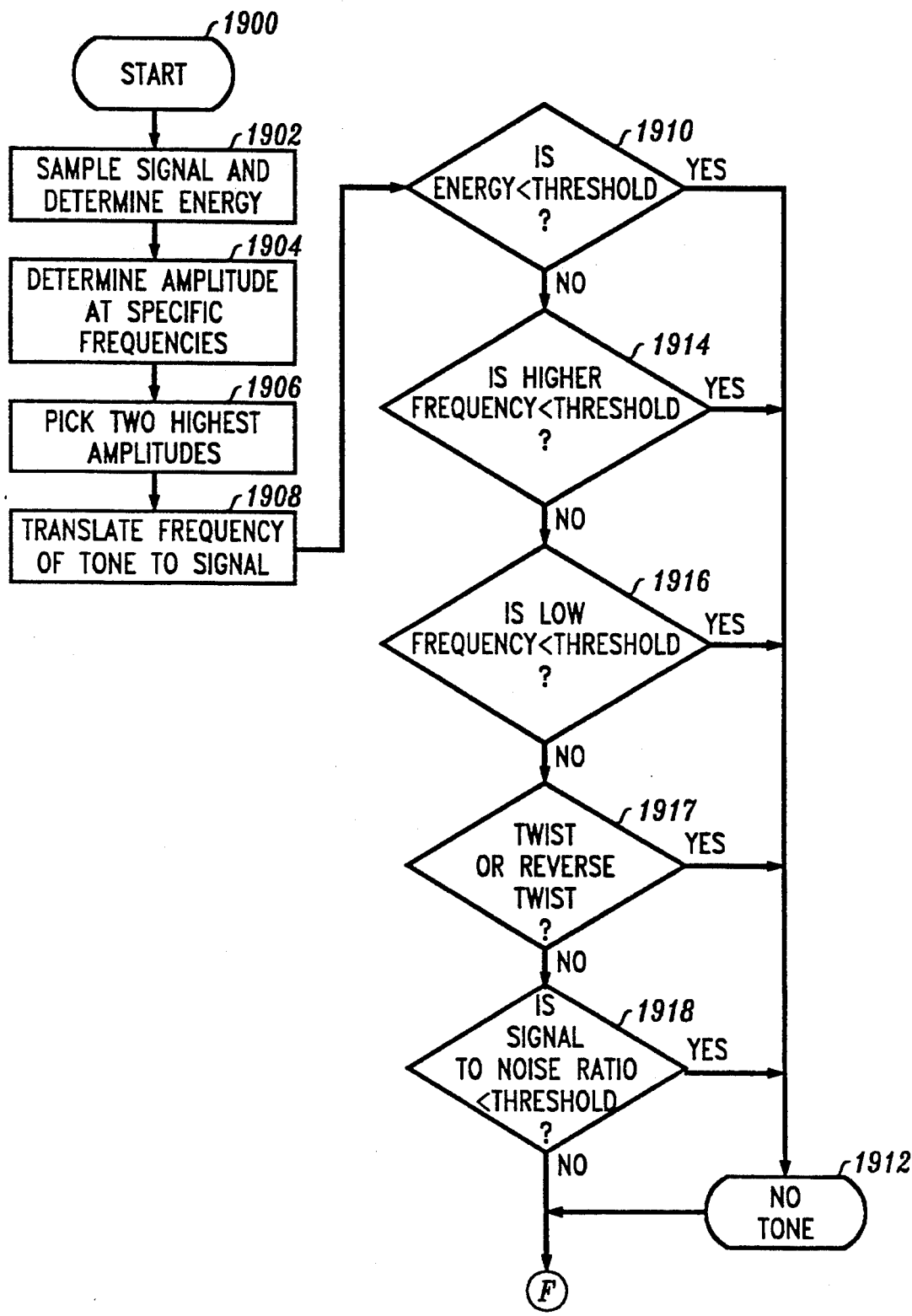

Turning now to FIG. 19, flow charts describing processing of blocks 1800–1806 is shown. Processing starts in circle 1900 and proceeds to block 1902, where the total energy of the sample is calculated. Processing proceeds to block 1904, where Goertzel analysis is performed at the frequencies of DTMF digits and the amplitudes of the DTMF digit frequencies are returned. Processing continues to block 1906, where the amplitudes of the frequencies returned by the Goertzel analysis are checked and the frequencies with the two highest amplitudes selected. Continuing to block 1908, the candidate tone of the possible DTMF digit is determined by using the frequencies with the two highest amplitudes as indexes into the DTMF digit table. If the two selected frequencies do not intersect, that is, there is no tone defined for those two frequency components, then the candidate tone is set to no tone.

Processing continues to decision diamond 1910, where a test is made to determine whether the energy as calculated in block 1902 is above a predetermined threshold. If the energy of the frame is not above the threshold, then it is not likely that a tone has been detected, and no tone has been detected, as set at oval 1912. If the energy is above the threshold, then processing continues to decision diamond 1914, where a test is made to determine whether the amplitude of the high frequency is above a predetermined threshold. If it is not, then it is not likely that a tone has been detected, processing proceeds to no tone, oval 1912. If the amplitude of the higher frequency is above the predetermined threshold, then processing proceeds to decision diamond 1916, where a test is made to determine whether the amplitude of the lower selected frequency is above a predetermined threshold. If it is not, then it is not likely that a tone is present, and processing proceeds to no tone, oval 1912.

Processing proceeds to decision diamond 1917, where a test is made to determine whether the difference between the amplitude of the higher frequency and the amplitude of the lower frequency is above a predefined threshold. This is the twist test, as discussed above. Also, a test is made to determine whether the difference between the amplitude of the lower frequency and the amplitude of the higher frequency is above a predefined threshold (reverse twist). If either of these are true, then it is not likely that a DTMF digit has been found, and the candidate tone is set to no tone in oval 1912.

If the differences in the amplitude of the two selected tones are less than the twist and reverse twist thresholds, then processing proceeds to decision diamond 1618, where a test is made to determine whether the signal-to-noise ratio (as previously defined) is above a predefined threshold. If it is not, then it is not likely that a tone has been detected, the candidate tone is set to no tone in oval 1912. Processing proceeds through connector F, to FIG. 20.

Turning now to FIG. 20, processing according to 1808, FIG. 18 is shown. Processing enters through connector F and proceeds to decision diamond 2002, where a test is made to determine whether the candidate tone in the present frame and the candidate tone of the previous frame are the same. If they are, then a DTMF digit has been found, the output is set to the candidate DTMF digit in box 2004, and the tone is returned in 2006. If they are not, then processing proceeds to decision diamond 2008, where a test is made to determine whether the candidate tone in the previous frame and the candidate tone in the frame preceding the previous frame are the same. If they are, then a valid tone is found, the output is set to the candidate DTMF digit in box 2004, and the tone is returned at 2006.

If the candidate tone in the previous frame and the candidate tone in the frame preceding the previous frame are not the same in decision diamond 2008, then processing proceeds to decision diamond 2010, where a test is made to determine whether the candidate tone in the present frame and the candidate tone in the frame preceding the previous frame are the same. If they are, then a valid tone is found, the output is set to the candidate DTMF digit in box 2004, and the tone returned at 2006. If they are not, then no tone has yet been found, the output is set to no tone in box 2012, and no tone is returned at 2006.

It is to be understood that the above-described embodiments are merely illustrative principles of the invention and that many variations may be devised by those skilled in the art without departing from the scope of the invention. It is, therefore, intended that such variations be included within the scope of the appended claims.

We claim:

1. A method of detecting dual-tone, multi-frequency (DTMF) indicators and single-tone indicators, said indicators being used in a telephone system to represent unique ones of a plurality of possible audible signaling tones, said method comprising the steps of:
   monitoring digitally sampled signals on a digital channel of said telephone system, said monitoring including collecting a frame having a predetermined number of said samples;
   determining amplitudes for a preselected plurality of frequencies in said digitally sampled signals;
   determining which two of said preselected plurality of frequencies have the highest amplitudes during said frame;
   determining from said two determined frequencies having the highest amplitudes whether a DTMF indicator or a single tone indicator is likely to be present in said signals;
   if it is determined that a DTMF indicator is likely to be present, comparing said two determined frequencies having the highest amplitudes to a plurality of predefined pairs of frequencies, each of said predefined frequency pairs defining one of said DTMF indicators, and selecting as a multi-frequency candidate the DTMF indicator having as its defining frequency pair, the frequency pair matching said two determined frequencies having the highest amplitudes;
   if it is determined that a single tone indicator is likely to be present, comparing a selected one of said two determined frequencies having the highest amplitudes to a plurality of predefined frequencies, each of said predefined frequencies defining one of said single tone indicators, and selecting as a single tone candidate the single tone indicator having as its defining frequency the frequency matching the one selected frequency;
   comparing the amplitude of said digitally sampled signals in said frame to an amplitude threshold dependent in a predetermined fashion upon the indicator corresponding to said candidate;
   determining a cadence of said digitally sampled signals; and
   delivering an identification of said indicator corresponding to said candidate if said digitally sampled signals satisfies said amplitude threshold and has a cadence corresponding to a predefined cadence for said indicator.

2. A method according to claim 1 wherein said step of determining which two of said preselected plurality of frequencies have the highest amplitudes comprises performing Goertzel analysis on said signals.

3. A method according to claim 1 wherein said step of determining a cadence of said digitally sampled signals comprises recording on and off transitions of said candidate and comparing said recorded state to predefined cadences of said call progress tones.

4. A method for detecting the presence of one of a plurality of dual-tone multi-frequency (DTMF) digits and a plurality of call progress tones in a digital signal and identifying said one of said DTMF digits and said call progress tones if present in said digital signal, said DTMF digits and said call progress tones having one or more predefined frequency components and said call progress tones having a characteristic predefined pattern, said method comprising the steps of:
  determining an amplitude for each of a predefined plurality of frequencies in said digital signal;
  selecting two frequencies in said signal with the highest amplitudes;
  comparing said two selected frequencies with said predefined one or more frequency components of each of said DTMF digits and each of said call progress tones to identify a candidate tone corresponding to one of said DTMF digits or call progress tones;
  comparing the amplitude of said digital signal to a predefined amplitude threshold, said predefined amplitude threshold being based on said candidate tone;
  determining a measured continuity period of said digital signal;
  if said digital signal satisfies said amplitude threshold and is continuous for a predetermined time period, and said candidate tone comprises one of said plurality of DTMF digits, generating an output signal representing said candidate tone; and
  if said digital signal satisfies said amplitude threshold and is continuous for a predetermined time period, and said candidate tone comprises a call progress tone, determining whether a pattern of said digital signal over time matches a predefined pattern, said predefined pattern dependent in a predetermined fashion upon said candidate tone, and generating an output signal representing said candidate tone if said pattern of said digital signal matches said predefined pattern.

5. A method according to claim 4 wherein said step of determining a measured continuity period comprises comparing said candidate tone to a previous candidate tone to determine whether said candidate tone is the same as said previous candidate tone.

6. A method according to claim 5 wherein said step of determining a measured continuity period further comprises:
  if said candidate tone and said previous candidate tone are not the same, comparing said previous candidate tone to a candidate tone preceding said previous candidate tone to determine whether said previous candidate tone and said candidate tone preceding said previous candidate tone are the same.

7. A method according to claim 6 wherein said step of determining a measured continuity period further comprises:
  if said previous candidate tone and said candidate tone preceding said previous candidate tone are not the same, comparing said candidate tone to said candidate tone to determine whether said candidate tone and said candidate tone preceding said previous candidate tone are the same.

8. A method according to claim 4 further including the step of:
  before said step of selecting two frequencies in said signal with the highest amplitudes, performing Goertzel analysis on said signal for said predefined frequencies of said DTMF digits and said call progress tones; and
  said step of selecting said two frequencies in said signal with the highest amplitudes comprises determining which two of said predefined frequencies of said DTMF digits and said call progress tones had the highest amplitudes in said Goertzel analysis.

9. A method according to claim 4 wherein said step of comparing the amplitude of said digital signal to a predefined amplitude threshold comprises comparing the amplitudes of said two frequencies with the highest amplitudes in said signal to a first set of predefined amplitude thresholds for DTMF digits if said candidate tone is a DTMF digit and comparing the amplitudes of said two frequencies in said signal with the highest amplitudes to a second set of predefined amplitude thresholds for call progress tones if said candidate tone is a call progress tone.

10. A method according to claim 4 further including the step of:
  after said step of comparing said two frequencies with said predefined one or more frequencies of each of said DTMF digits and each of said call progress tones to identify said candidate tone, comparing the total energy of said digital signal over a predetermined time to a predetermined energy threshold.

11. A method according to claim 4 further including the step of:
  after said step of comparing said two frequency components with said predefined one or more frequencies of each of said DTMF digits and each of said call progress tones to identify said candidate tone, comparing a signal to noise ratio of the amplitudes of said two frequencies to a predetermined signal to noise ratio.

12. A method according to claim 4 further including the step of:
  after said step of selecting two frequencies in said signal with the highest amplitudes, determining whether said amplitudes are within a predefined amount of each other.

13. A digital signal processing apparatus for detecting and reporting the presence of dual-tone, multi-frequency (DTMF) digits and call progress tones in a digital signal, said DTMF digits and said call progress tones having one or more predefined frequency components and said call progress tones having predefined patterns, said predefined patterns defining a type of call progress tone when a plurality of call progress tones comprise the same frequency, said apparatus comprising:
  means for determining two frequencies in said signal with the highest amplitudes;
  means for comparing said two determined frequencies with said predefined one or more frequency components of each of said DTMF digits and each of said call progress tones to identify a candidate tone comprising one of said DTMF digits and call progress tones;

means for comparing the amplitude of said determined two frequencies to a predefined amplitude threshold, said predefined amplitude threshold being dependent in a predetermined fashion upon said candidate tone;

means for determining a continuity period of said candidate tone;

means for generating an output signal representing said candidate tone, responsive to said candidate tone comprising a DTMF digit, satisfying said amplitude threshold and being continuous for a predetermined time;

means for determining whether a pattern of said candidate tone matches a predefined pattern, said predefined pattern being dependent in a predetermined fashion upon said candidate tone; and means for generating an output signal representing said candidate call progress tone responsive to said candidate tone satisfying said amplitude threshold, being continuous for a predetermined time and matching one of said predefined patterns.

14. Telephone station set apparatus connectable to one or more subscriber channels, said apparatus comprising:

audio means for transmitting and receiving audible voice communication;

switch means for selectively interconnecting said one or more subscriber channels to said audio means;

control means responsive to user actions for controlling the selective interconnection effected by said switch means; and digital signal processing means connectable under control of said control means to said one or more subscriber channels, said signal processing means responsive to said control means for detecting and reporting the presence of dualtone, multi-frequency (DTMF) digits and call progress tones in a digital signal on said one or more subscriber channels, said DTMF digits and said call progress tones having one or more predefined frequency components and said call progress tones having predefined patterns, said predefined patterns defining a specific call progress tone when a plurality of call progress tones have the same frequency components, said signal processing means having:

means for determining two frequencies in said signal with the highest amplitudes;

means for comparing said two determined frequencies with said predefined one or more frequency components of each of said DTMF digits and each of said call progress tones to identify a candidate tone comprising one of said DTMF digits and call progress tones;

means for comparing the amplitude of said determined two frequencies to a predefined amplitude threshold, said predefined amplitude threshold being dependent in a predetermined fashion upon said candidate tone;

means for determining a continuity period of said candidate tone;

means for generating an output signal representing said candidate tone, responsive to said candidate tone comprising a DTMF digit, satisfying said amplitude threshold and being continuous for a predetermined time;

means for determining whether a pattern of said candidate tone matches a predefined pattern, said predefined pattern being dependent in a predetermined fashion upon said candidate tone; and means for generating an output signal to said control means representing said candidate call progress tone responsive to said candidate tone satisfying said amplitude threshold, being continuous for a predetermined time, and matching one of said predefined patterns.

15. A telephone switching system comprising:

a plurality of channels;

switch means for selectively interconnecting said plurality of channels;

control means responsive to user actions for controlling the selective interconnections effected by said switch means; and digital signal processing means connectable under control of said control means to said one or more channels, said signal processing means responsive to said control means for detecting and reporting the presence of dual-tone, multi-frequency (DTMF) digits and call progress tones in a digital signal on said one or more subscriber channels, said DTMF digits and said call progress tones having one or more predefined patterns, said predefined patterns defining a specific call progress tone when a plurality of call progress tones have the said frequency components, said signal processing means having:

means for determining two frequencies in said signal with the highest amplitudes;

means for comparing said two determined frequencies with said predefined one or more frequency components of each of said DTMF digits and each of said call progress tones to identify a candidate tone comprising one of said DTMF digits and call progress tones;

means for comparing the amplitude of said two determined frequencies to a predefined amplitude threshold, said predefined amplitude threshold being dependent in a predetermined fashion upon said candidate tone;

means for determining a continuity period of said candidate tone;

means for generating an output signal representing said candidate tone, responsive to said candidate tone comprising a DTMF digit, satisfying said amplitude threshold and being continuous for a predetermined time;

means for determining whether a pattern of said candidate tone matches a predefined pattern, said predefined pattern being dependent in a predetermined fashion upon said candidate tone; and means for generating an output signal to said control means representing said candidate call progress tone responsive to said candidate tone satisfying said amplitude threshold, being continuous for a predetermined time, and matching one of said predefined patterns.

16. A method of detecting call waiting tones in a telephone system, said method comprising the steps of:

monitoring signals on a digital channel of said telephone system, said digital channel having digitally sampled signals, said monitoring including collecting a frame having a predetermined number of said samples;

determining an amplitude component for a preselected plurality of frequency components of said signals;

selecting two of said preselected plurality of frequency components having the highest amplitudes during said frame;

determining whether one frequency component is present in said signal by comparing said amplitudes of said selected two frequency components;

if one frequency component is present in said signal, determining whether said one frequency component matches a predefined frequency of said call waiting tone;

comparing the amplitude of said one of said two detected frequencies with the higher amplitude to an amplitude threshold dependent in a predetermined fashion upon said call waiting tone;

determining a continuity over time of said call waiting tone;

determining the pattern over time of said call waiting tone, and matching said pattern to predefined patterns of call waiting tones; and delivering a representation of said call waiting tone if said amplitude threshold is satisfied, said call waiting tone is continuous for a predetermined time, and said determined pattern matches a predefined pattern of call waiting tones.

* * * * *